United States Patent
Inaba et al.

(10) Patent No.: US 11,945,369 B2
(45) Date of Patent: Apr. 2, 2024

(54) DISPLAY DEVICE AND CONTROL CIRCUIT

(71) Applicant: Panasonic Intellectual Property Management Co., Ltd., Osaka (JP)

(72) Inventors: Yasunobu Inaba, Kanagawa Ken (JP); Yuji Matsumoto, Kanagawa Ken (JP); Koji Marumo, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 294 days.

(21) Appl. No.: 17/205,768

(22) Filed: Mar. 18, 2021

(65) Prior Publication Data

US 2021/0300247 A1 Sep. 30, 2021

(30) Foreign Application Priority Data

Mar. 27, 2020 (JP) ................................. 2020-058598

(51) Int. Cl.
*B60R 1/08* (2006.01)
*B60K 35/00* (2006.01)
(Continued)

(52) U.S. Cl.
CPC .............. *B60R 1/088* (2013.01); *B60K 35/00* (2013.01); *B60R 1/12* (2013.01); *B60R 1/26* (2022.01);
(Continued)

(58) Field of Classification Search
CPC ... B60R 1/088; B60R 1/12; B60R 2001/1253; B60R 2300/20; B60R 1/00; B60R 1/04;
(Continued)

(56) References Cited

U.S. PATENT DOCUMENTS 6,520,667 B1 * 2/2003 Mousseau ................. B60R 1/12
359/603
6,595,649 B2 * 7/2003 Hoekstra ................. B60R 1/088
359/603
(Continued)

FOREIGN PATENT DOCUMENTS

CN 1422768 6/2003
CN 101535087 9/2009
(Continued)

OTHER PUBLICATIONS

Office Action from Japan Patent Office (JPO) in Japanese Patent Appl. No. 2020-058598, dated May 23, 2023, together with an English translation.
(Continued)

*Primary Examiner* — Michael Lee
(74) *Attorney, Agent, or Firm* — Greenblum & Bernstein, P.L.C.

(57) ABSTRACT

A display device installed in a vehicle includes a display, a reflectance control device, and a control circuit. The reflectance control device is capable of changing a reflectance for incident light. The control circuit controls the reflectance of the reflectance control device. The reflectance control device includes a first part and a second part. The first part is positioned in a first region overlapping the display surface when viewed in a normal direction being normal to the display surface. The second part is positioned in a second region surrounding the first region when viewed in the normal direction of the display surface. The control circuit controls a reflectance of the second part based on at least one of speed information indicating a speed of the vehicle and reverse information indicating whether the vehicle is reversing.

11 Claims, 9 Drawing Sheets

(51) Int. Cl.
*B60R 1/12* (2006.01)
*B60R 1/26* (2022.01)
*G02F 1/133* (2006.01)
*G02F 1/1343* (2006.01)

(52) U.S. Cl.
CPC ...... *G02F 1/13312* (2021.01); *B60K 2370/23* (2019.05); *B60K 2370/779* (2019.05); *B60R 2001/1253* (2013.01); *G02F 1/134381* (2021.01)

(58) Field of Classification Search
CPC ............ B60R 2001/1215; B60K 35/00; B60K 2370/23; B60K 2370/779; B60K 37/04; B60K 2370/37; B60K 2370/39; G02F 1/13312; G02F 1/134381; G02F 1/13306; G02F 1/13318; G02F 1/134309; G02F 1/13471; G02F 1/133536
See application file for complete search history.

(56) References Cited

U.S. PATENT DOCUMENTS

| | | | |
|---|---|---|---|
| 2002/0140884 A1* | 10/2002 | Richard | G02F 1/1397 349/113 |
| 2003/0020603 A1* | 1/2003 | DeLine | G06Q 20/341 340/425.5 |
| 2003/0122059 A1* | 7/2003 | Su | B60R 1/088 250/214 B |
| 2004/0160657 A1* | 8/2004 | Tonar | B60R 1/12 257/E33.059 |
| 2006/0050356 A1* | 3/2006 | Varaprasad | G02B 5/0858 359/265 |
| 2009/0002575 A1 | 1/2009 | Yamada et al. | |
| 2009/0015736 A1* | 1/2009 | Weller | B60R 1/12 362/494 |
| 2009/0201137 A1 | 8/2009 | Weller et al. | |
| 2009/0262298 A1 | 10/2009 | Chen | |
| 2010/0194890 A1 | 8/2010 | Weller et al. | |
| 2012/0026570 A1* | 2/2012 | Luten | C03C 17/3618 359/636 |
| 2013/0300960 A1* | 11/2013 | Wen | G02F 1/13306 349/114 |
| 2014/0139902 A1* | 5/2014 | Baumann | G02F 1/155 359/275 |
| 2015/0085121 A1 | 1/2015 | Englander et al. | |
| 2015/0232034 A1 | 8/2015 | Weller et al. | |
| 2016/0375833 A1* | 12/2016 | Larson | B60R 1/12 348/148 |
| 2017/0082853 A1* | 3/2017 | Yoshimoto | G02B 27/01 |
| 2017/0297498 A1* | 10/2017 | Larson | B60R 1/00 |
| 2018/0017830 A1* | 1/2018 | Saenger Nayver | B60Q 1/00 |
| 2018/0056878 A1 | 3/2018 | Weller et al. | |
| 2018/0095587 A1 | 4/2018 | Kurasawa et al. | |
| 2018/0249066 A1 | 8/2018 | Katsumata et al. | |
| 2019/0009724 A1 | 1/2019 | Weller et al. | |
| 2019/0028656 A1 | 1/2019 | Timoneda et al. | |
| 2019/0092238 A1* | 3/2019 | Karner | B60Q 9/008 |
| 2019/0217782 A1 | 7/2019 | Weller et al. | |
| 2019/0263317 A1 | 8/2019 | Chen et al. | |
| 2020/0329192 A1 | 10/2020 | Katsumata et al. | |
| 2021/0155160 A1* | 5/2021 | Uken | G06F 3/047 |
| 2022/0001804 A1 | 1/2022 | Weller et al. | |

FOREIGN PATENT DOCUMENTS

| | | | |
|---|---|---|---|
| CN | 101561570 | 10/2009 | |
| CN | 101738812 | 6/2010 | |
| CN | 202608667 | 12/2012 | |
| DE | 102013007010 | 8/2014 | |
| DE | 102013007010 B3 * | 8/2014 | ............... B60R 1/08 |
| DE | 102019111312 | 11/2020 | |
| EP | 2322984 | 5/2011 | |
| JP | 61-193431 | 12/1986 | |
| JP | 06-022083 | 3/1994 | |
| JP | 2006-248384 | 9/2006 | |
| JP | 2006248384 A * | 9/2006 | |
| JP | 2007-221200 | 8/2007 | |
| JP | 2008168705 A * | 7/2008 | |
| JP | 2009-008881 | 1/2009 | |
| JP | 2017-198853 | 11/2017 | |
| JP | 2018-052215 | 4/2018 | |
| JP | 2018-060327 | 4/2018 | |
| JP | 2019-018846 | 2/2019 | |
| KR | 10-2014-0040430 | 4/2014 | |
| WO | 2004/098953 | 11/2004 | |

OTHER PUBLICATIONS

Office Action issued by the China National Intellectual Property Administration (CNIPA)) in Chinese Patent Application No. 202110311643.8, dated Jun. 21, 2023, together with an English language translation.

Office Action from German Patent and Trademark Office in German Patent Appl. No. 10 2021 107 338.3, dated Nov. 21, 2023, together with an English language translation.

* cited by examiner

DISPLAY DEVICE AND CONTROL CIRCUIT

CROSS-REFERENCE TO RELATED APPLICATIONS

This application is based upon and claims the benefit of priority from Japanese Patent Application No. 2020-058598, filed on Mar. 27, 2020, the entire contents of which are incorporated herein by reference.

FIELD

The present disclosure relates to a display device and a control circuit.

BACKGROUND

Recently known are display systems and display devices relating thereto used instead of conventional rearview mirrors to capture an image of the rear of a vehicle using an imaging device and display the captured image. For example, Japanese Patent Application Laid-open No. 2009-8881 discloses a liquid crystal glare-proof mirror including a liquid crystal cell having two control areas and an image forming device disposed on the back surface of the liquid crystal cell to output light to one of the control areas.

Display devices are expected to be further improved.

SUMMARY

A display device according to the present disclosure is installed in a vehicle, the display device including: a display including a display surface on which video is displayed and being switched between ON and OFF; a reflectance control device positioned on the display surface side of the display and configured to change a reflectance for incident light; and a control circuit. The control circuit is configured to control: the reflectance of the reflectance control device; the switching between ON and OFF of the display; and the video displayed on the display surface. The reflectance control device includes a first part and a second part, the first part being positioned in a first region overlapping the display surface when viewed in a normal direction being normal to the display surface, the second part being positioned in a second region surrounding the first region when viewed in the normal direction of the display surface. The control circuit controls a reflectance of the second part based on at least one of speed information indicating a speed of the vehicle and reverse information indicating whether the vehicle is reversing.

DETAILED DESCRIPTION

Figure 1:
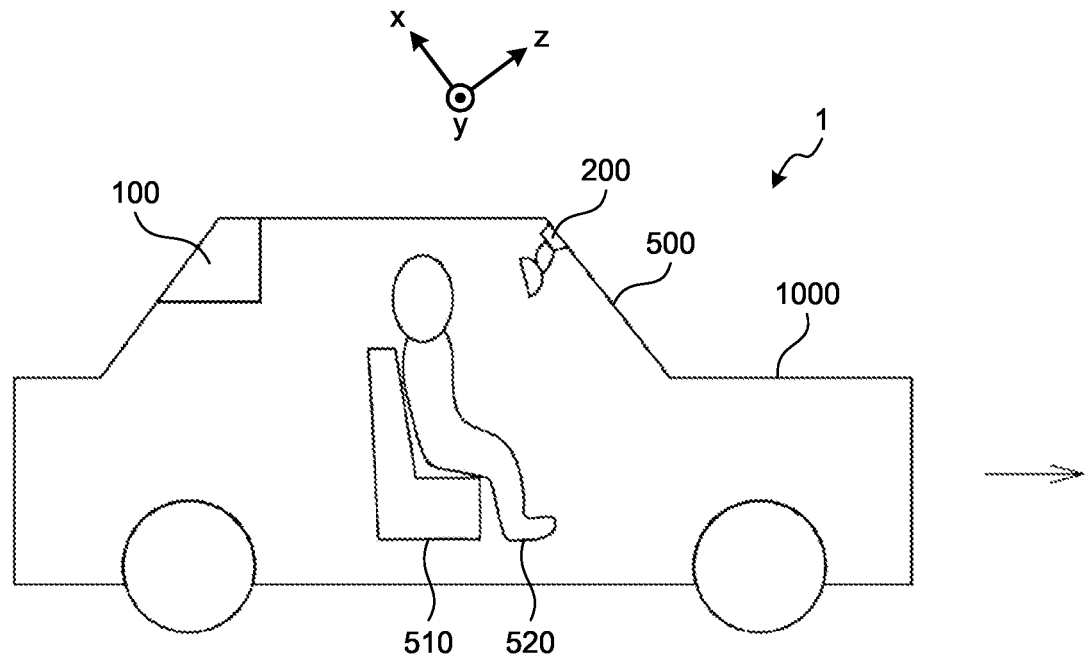
FIG. 1 is a schematic of a display system according to a first embodiment.

Knowledge Serving as the Basis of the Present Disclosure

The inventors' knowledge serving as the basis of the present disclosure is described first before specific explanation of embodiments. When a driver checks the rear of a vehicle using a rearview mirror, for example, a view reflected in an end part of the rearview mirror seems to flow rearward faster than a view reflected in a center part of the rearview mirror as the speed of the own vehicle increases. When the speed of the own vehicle increases to substantially a speed of vehicles traveling on a highway, for example, it may possibly be difficult for the driver to check the view reflected in the end part of the rearview mirror. Keeping looking at the rearview mirror in this state may possibly be a burden on the driver. These problems are also caused when the driver checks the rear of the vehicle by viewing an image of the rear of the vehicle displayed on a display device.

There have been developed display devices including a light penetration/reflection layer disposed on the front surface of a display to reflect part of incident light and cause the other part to penetrate the layer. With this configuration, the driver can check the rear of the vehicle by selecting an appropriate method from: viewing an image of light passing through the light penetration/reflection layer in the light of an image displayed on the display and viewing an image of light reflected by the light penetration/reflection layer with no image displayed on the display. When the area of the display is smaller than that of the light penetration/reflection layer in planar view, for example, a control circuit disposed near the display to drive the display may possibly be seen through the light penetration/reflection layer. When the area of the display is made equivalent to that of the light penetration/reflection layer in planar view, and the control circuit is covered with the housing of the display device to prevent the control circuit from being seen through the light penetration/reflection layer, the frame of the housing needs to have a larger area. Both cases are undesirable for the appearance of the display device.

In the display devices including the light penetration/reflection layer disposed on the front surface of the display described above, the visibility of an image displayed on the display or an image reflected by the light penetration/reflection layer may possibly deteriorate depending on a change in the environment around the vehicle. The change in the environment around the vehicle is a change in brightness around the vehicle, for example.

To address at least one of these disadvantages, a display device or a control circuit according to the present disclosure has the configuration described below. In the following description, the same or equivalent components, members, or processes illustrated in the drawings are denoted by like reference numerals, and overlapping explanation thereof is appropriately omitted. To facilitate the reader's understanding, the sizes of the members in the drawings are appropriately enlarged or reduced.

First Embodiment

FIG. 1 is a diagram of an example of a schematic configuration of a display system 1 according to a first embodiment of the present disclosure. The display system 1 according to the present embodiment is installed in a vehicle 1000. The display system 1 includes an imaging device 100 and a display device 200.

The right side of FIG. 1 corresponds to the front side of the vehicle 1000. In other words, when the vehicle 1000 travels forward, the vehicle 1000 travels toward the right side of FIG. 1. The vehicle 1000 includes a windshield 500 and a seat 510.

As illustrated in FIG. 1, an orthogonal coordinate system composed of an x-axis, a y-axis, and a z-axis is defined. The x-axis extends along the windshield 500. In other words, the x-axis has an inclination angle equal to that of the windshield 500. The positive direction of the x-axis is a direction extending upward along the windshield 500 toward the rear of the vehicle 1000. The negative direction of the x-axis is a direction extending downward along the windshield 500 toward the front of the vehicle 1000. The y-axis is orthogonal to the x-axis. The y-axis extends along the lateral direction of the vehicle 1000. As a result, the x-y plane corresponds to the surface of the windshield 500. The positive direction of the y-axis is a direction toward the right side of the vehicle 1000 when the vehicle 1000 travels forward. The negative direction of the y-axis is a direction toward the left side of the vehicle 1000 when the vehicle 1000 travels forward. The z-axis is orthogonal to the x-axis and the y-axis. In other words, the z-axis extends along the normal direction of the surface of the windshield 500. The positive direction of the z-axis is a direction in which the normal to the surface of the windshield 500 extends toward the front of the vehicle 1000. The negative direction of the z-axis is a direction in which the normal to the surface of the windshield 500 extends toward the rear of the vehicle 1000. In other words, the negative directions of the x-axis, the y-axis, and the z-axis are defined to be opposite to the respective positive directions. The positive directions of the x-axis and the z-axis are indicated by the arrows in FIG. 1.

In the following description, the positive direction of the x-axis may be referred to as the "rear" or the "rear side", and the negative direction of the x-axis may be referred to as the "front" or the "front side". The positive direction of the y-axis may be referred to as the "right" or the "right side", and the negative direction of the y-axis may be referred to as the "left" or the "left side". The positive direction of the z-axis may be referred to as "above" or the "upper side", and the negative direction of the z-axis may be referred to as "below" or the "lower side". The rear and the front with respect to the x-axis are different from the rear and the front with respect to the vehicle 1000, and the upper side and the lower side with respect to the z-axis are different from the upper side and the lower side with respect to the vehicle 1000. These terms may be used without being clearly distinguished from one another.

The imaging device 100 images the rear of the vehicle 1000. The imaging device 100 is installed at the rear part of the vehicle 1000. The imaging device 100 outputs the captured image to the display device 200. The vehicle 1000 may include an electronic control unit, which is not illustrated, and the imaging device 100 may be connected to the display device 200 via the ECU. In other words, the imaging device 100 may be connected to the display device 200 via a network. The connection via a network is established using any one of wireless communications, wired communications, and a combination of these communications. The imaging device 100 may be directly connected to the display device 200. The following describes an example where the vehicle 1000 includes the ECU.

The display device 200 receives an image from the imaging device 100 and displays the image received from the imaging device 100. The display device 200 is attached at a position where an occupant 520 can view the image in the vehicle 1000. The occupant 520 is seated on the seat 510. The display device 200 may be disposed on the windshield 500. The display device 200, for example, may be disposed at a position near the center of the windshield 500 in the lateral direction and near the upper end of the windshield 500 in the vertical direction. When the seat 510 is the driver's seat, the occupant 520 corresponds to a driver.

Figure 2:
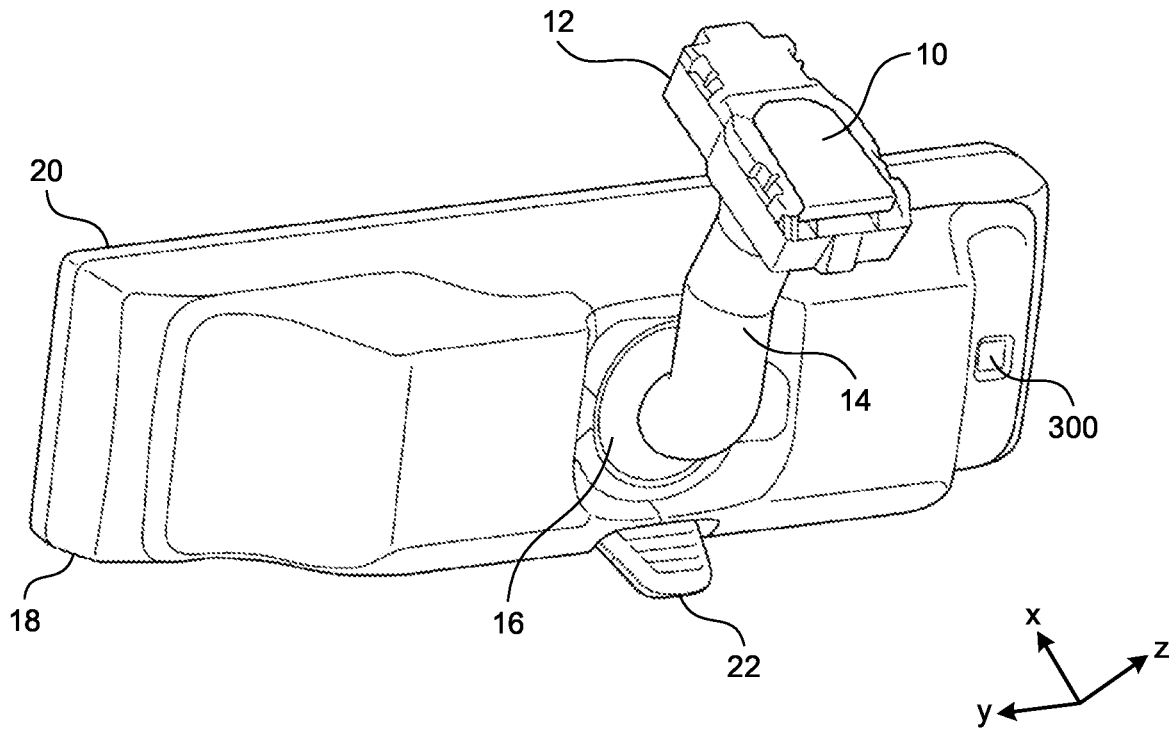
FIG. 2 is a perspective view of the configuration of a display device according to the first embodiment.
Figure 3:
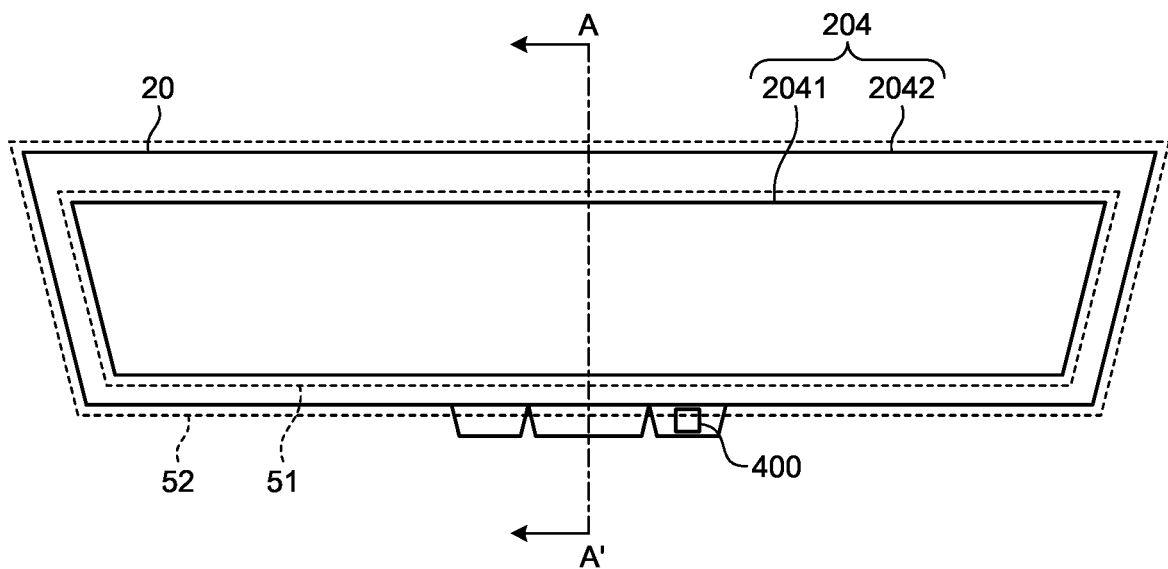
FIG. 3 is a front view of a schematic configuration of the display device according to the first embodiment.
Figure 4:
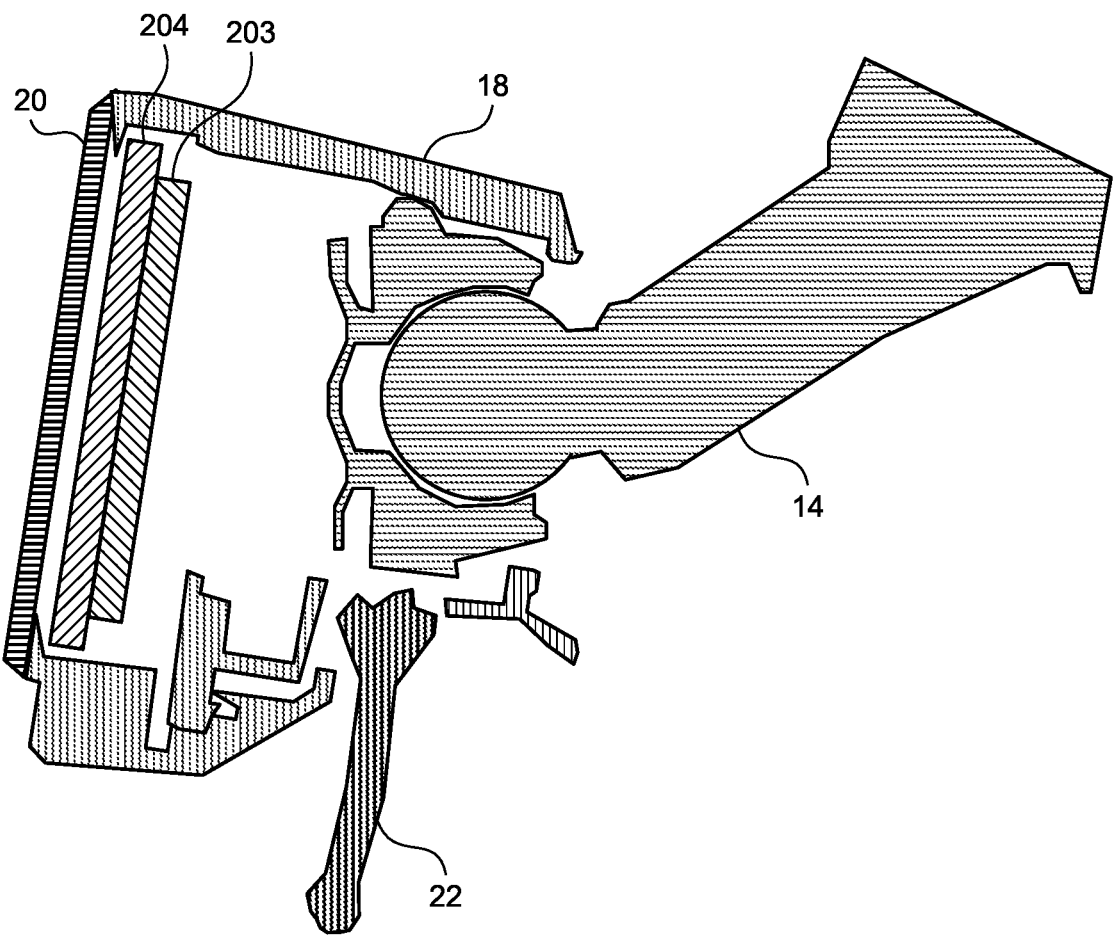
FIG. 4 is a sectional view of the configuration of the display device according to the first embodiment in a first orientation.
Figure 5:
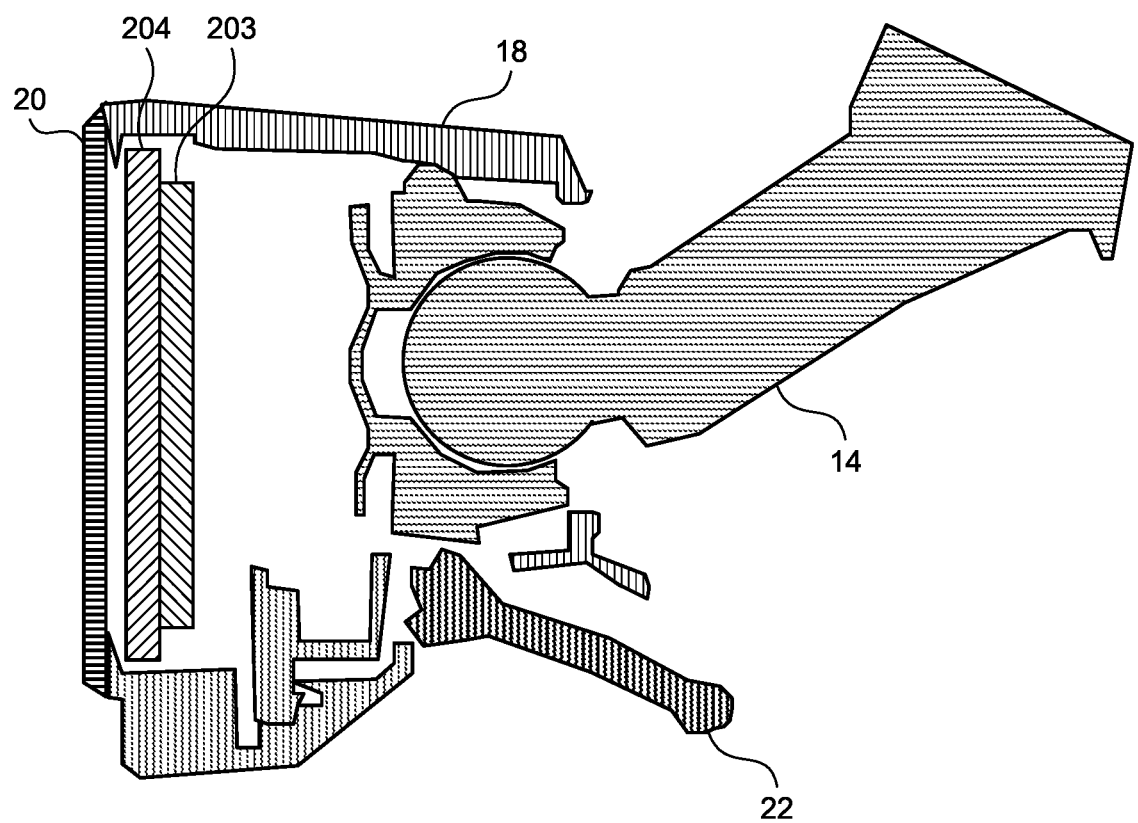
FIG. 5 is a sectional view of the configuration of the display device according to the first embodiment in a second orientation.

The following describes the display device 200 according to the first embodiment in greater detail with reference to FIGS. 2 to 7. FIG. 2 is a perspective view of the configuration of the display device 200. FIG. 3 is a front view of a schematic configuration of the display device 200. FIG. 4 is a sectional view of the configuration of the display device 200 in a first orientation. FIG. 5 is a sectional view of the configuration of the display device 200 in a second orientation. FIGS. 4 and 5 illustrate a section of the display device 200 in the orientations along line A-A' in FIG. 3. To simplify the explanation, FIG. 3 does not illustrate components for fixing the display device 200 to the vehicle 1000, such as a base 10, a mount 12, a stay 14, and a connection plate 16, which will be described later, or an actuator 22. To simplify the explanation, illustrations of various kinds of wiring, circuit boards, and other components disposed in the display device 200 are omitted in the sectional views of FIGS. 4 and 5. To implement the display device 200 according to the present disclosure, various kinds of wiring, circuit boards, and other components are appropriately disposed in the display device 200.

The display device 200 according to the first embodiment includes a housing 18, a glass panel 20, an actuator 22, a display 203, and a reflectance control unit (a reflectance control device) 204. The display device 200 may include a first illuminance sensor 300 and a second illuminance sensor 400. Alternatively, the display system 1 may include the first illuminance sensor 300 and the second illuminance sensor 400. Neither the first illuminance sensor 300 nor the second illuminance sensor 400 may be disposed in the display device 200. The display device 200 is fixed to the vehicle 1000 by the base 10, the mount 12, the stay 14, and the connection plate 16. The display device 200 may include the base 10, the mount 12, the stay 14, and the connection plate 16.

The base 10 has a plate shape and is made of hard material. The hard material is metal, for example. The base 10 has a longer length in the longitudinal direction than in the lateral direction. The base 10 has an upper surface facing upward and a lower surface facing downward. The upper surface of the base 10 is fixed to the vehicle 1000. The upper surface of the base 10 is fixed to the windshield 500 with an adhesive, for example. The base 10 may be fixed using another method as long as the display device 200 can be fixed at a position equivalent to that of a conventional rearview mirror. The strength of fixing the base 10 to the vehicle 1000 is sufficiently strong to prevent the base 10 from falling off the vehicle 1000 when the mount 12, the stay 14, the connection plate 16, the housing 18, and the glass panel 20, which will be described layer, receive external force due to a shock in a sudden stop or a crash of the vehicle 1000.

The mount 12 is attached to the base 10. The mount 12 has a shape capable of being slid and incorporated with the base 10, for example. The mount 12 is made of a rigid body. The rigid body means an object not deformed when the mount 12 is slid and incorporated with the base 10. The mount 12 is made of an alloy of aluminum, magnesium, zinc, or other metals, for example. The mount 12 may be made of an aluminum alloy, such as ADC. The mount 12 may be made of filler-containing glass or resin. The filler may be glass or carbon fiber.

The stay 14 is connected to the lower part of the mount 12 and to the connection plate 16. The stay 14 has a shape curving and extending downward and rearward. The connection plate 16 is connected to the back surface of the housing 18. The connection plate 16 has a curved shape. The stay 14 and the connection plate 16 are made of resin material, for example. The mount 12 and the stay 14, the stay 14 and the connection plate 16, or the mount 12, the stay 14, and the connection plate 16 may be integrally formed. The stay 14 may be a rigid body like the mount 12 because the stay 14 is made of the same material as that of the mount 12. Connection between the mount 12 and the stay 14, connection between the stay 14 and the connection plate 16, connection between the connection plate 16 and the housing 18, the structure of the stay 14, and the structure of the connection plate 16 are not explained herein because they can be fabricated using publicly known technologies.

The housing 18 includes the display 203 and the reflectance control unit 204. The housing 18 has a box shape, for example, and the display 203 and the reflectance control unit 204 may be disposed in the housing 18. The housing 18 may have a box shape that is long in the lateral direction. The housing 18 is supported by the stay 14 through the connection plate 16. The housing 18 has an opening 24 at the front part of the display device 200. The reflectance control unit 204 is visually recognized through the opening 24 of the housing 18 at the front part of the display device 200. The front surface of the housing 18 is provided with the glass panel 20. The glass panel 20 may be disposed so as to protect the display 203 and the reflectance control unit 204. In other words, the glass panel 20 may be disposed covering the front surface of the display 203 and the reflectance control unit 204 when viewed in the normal direction of the display surface of the display 203.

The actuator 22 has a configuration capable of switching the orientations of the reflectance control unit 204 between a first orientation and a second orientation, which will be described later. The actuator 22 may have a lever shape, for example. Switching the position of the actuator 22 having a lever shape, for example, may change the inclination of the housing 18. The change in the inclination of the housing 18 changes the position of the reflectance control unit 204 disposed in the housing 18. As a result, the actuator 22 may switch the orientations of the reflectance control unit 204 between the first orientation and the second orientation.

The actuator 22 does not necessarily have a lever shape as long as it can switch the orientations of the reflectance control unit 204. The actuator 22 may have a button shape, for example. In the example illustrated in FIGS. 4 and 5, which will be described later, the actuator 22 switches the orientations of the reflectance control unit 204 disposed in the housing 18 by changing the inclination of the housing 18. The actuator 22 may be configured to switch only the orientations of the reflectance control unit 204 without changing the inclination of the housing 18. In this case, the actuator 22 may be directly connected to the reflectance control unit 204 to switch the orientations of the reflectance control unit 204.

The first illuminance sensor 300 detects illuminance of the front of the vehicle 1000. The first illuminance sensor 300 according to the present embodiment is disposed on the back surface of the housing 18. The first illuminance sensor 300 detects light passing through the windshield 500 from the front of the vehicle 1000 and incident on the first illuminance sensor 300, thereby detecting the brightness of the front of the vehicle 1000. The first illuminance sensor 300 may be used to detect the brightness in the traveling environment for the vehicle 1000, for example. The first illuminance sensor 300 may be used to detect that the traveling environment for the vehicle 1000 is daytime or nighttime, for example. The first illuminance sensor 300 may be used to detect whether the vehicle 1000 is traveling in a tunnel, for example. The first illuminance sensor 300 outputs first illuminance information. The first illuminance information includes a first sensor value indicating the detected brightness, for example. The first illuminance sensor 300 may be positioned at the front part of the vehicle 1000. In other words, the first illuminance sensor 300 may be attached to the front part of the vehicle 1000. The first illuminance sensor 300 is a silicon photo-sensor, for example.

The second illuminance sensor 400 detects illuminance of the rear of the vehicle 1000. In other words, the second illuminance sensor 400 detects the intensity of light incident on the front surface of the display device 200. The second illuminance sensor 400 according to the present embodiment is disposed on the front surface of the housing 18. With this configuration, the second illuminance sensor 400 detects the intensity of light incident on the reflectance control unit 204. The second illuminance sensor 400 may be disposed in the housing 18 in a manner covered with the glass panel 20. The second illuminance sensor 400 may be used to detect a high beam output from the headlights of following vehicles to the vehicle 1000, for example. The second illuminance sensor 400 outputs second illuminance information. The second illuminance information includes a second sensor value indicating the detected intensity of light, for example. The second illuminance sensor 400 is a silicon photo-sensor, for example.

The second illuminance sensor 400 may be positioned at the rear part of the vehicle 1000. In other words, the second illuminance sensor 400 may be attached to the rear part of the vehicle 1000. The second illuminance sensor 400 may be attached to the rear part of the vehicle 1000 such that it can detect the intensity of light output to the vehicle 1000 from the rear of the vehicle 1000. The light output to the vehicle 1000 from the rear of the vehicle 1000 passes through a glass at the rear part of the vehicle 1000 and is incident on the front surface of the display device 200. Also in the case where the second illuminance sensor 400 attached to the vehicle 1000 is used, the value indicating the intensity of light detected by the second illuminance sensor 400 can be used as the value indicating the intensity of light incident on the front surface of the display device 200. The imaging device 100 may also serve as the second illuminance sensor 400. When the imaging device 100 also serves as the second illuminance sensor 400, the processing for detecting the intensity of light incident on the front surface of the display device 200 may be performed based on the brightness of an image acquired by the imaging device 100. This processing may be performed by a processing circuit 102 or a control circuit 202, which will be described later.

The display 203 displays an image captured by the imaging device 100. The display 203 has a first surface 2031 (an example of the "display surface") and a second surface 2032. The first surface 2031 is a surface on which an image is displayed. The second surface 2032 is positioned opposite to the first surface 2031. The first surface 2031 is also referred to as the front surface of the display. The second surface 2032 is also referred to as the rear surface of the display. The display 203 can be switched between ON and OFF. In other words, the display 203 can be switched between the ON state of displaying an image and the OFF state of displaying no image. The display 203 is a liquid crystal display or an organic electro-luminescence display, for example.

The reflectance control unit 204 can change the reflectance for incident light. By changing the reflectance for incident light, the transmittance for incident light at the reflectance control unit 204 is changed. The transmittance for incident light can be changed such that the display 203 can be visually recognized through the reflectance control unit 204. The configuration of the reflectance control unit 204 will be described later in greater detail.

When using the display device 200, the occupant 520 can switch the following states: a state where an image obtained by imaging the rear of the vehicle is displayed on the display 203, and the occupant 520 checks the rear of the vehicle by viewing the image; and a state where the rear of the vehicle is reflected by the reflectance control unit 204, and the occupant 520 checks the rear of the vehicle by viewing the mirror image.

When the occupant 520 checks the rear of the vehicle by viewing the image displayed on the display 203, the image displayed on the display 203 is visually recognized by the occupant 520 through the reflectance control unit 204. When the occupant 520 checks the rear of the vehicle 1000 by viewing the mirror image reflected in the reflectance control unit 204, the display 203 displays no image or displays a black image on the whole surface. When the display 203 displays no image or displays a black image on the whole surface, the display 203 is less likely to be visually recognized by the occupant 520 through the reflectance control unit 204.

The following describes switching the orientations of the reflectance control unit 204 and the respective orientations in greater detail with reference to FIGS. 4 and 5.

The first orientation is an orientation of the reflectance control unit 204 taken when the occupant 520 checks the rear of the vehicle by viewing the image displayed on the display 203. The second orientation is an orientation of the reflectance control unit 204 taken when the occupant 520 checks the rear of the vehicle 1000 by viewing the mirror image reflected in the reflectance control unit 204. As illustrated in FIGS. 4 and 5, a change in the position of the actuator 22 can change the inclination of the housing 18, thereby switching the orientations of the reflectance control unit 204. Specifically, when the actuator 22 is operated to move toward the front of the display device 200, that is, closer to the occupant 520, the reflectance control unit 204 is switched to the first orientation. By contrast, when the actuator 22 is operated to move toward the rear of the display device 200, that is, away from the occupant 520, the reflectance control unit 204 is switched to the second orientation.

In comparison between the first orientation and the second orientation, the normal direction of the reflectance control unit 204 faces more upward in the first orientation (FIG. 4) than in the second orientation (FIG. 5). In the first orientation (FIG. 4), the ceiling of the cabin is reflected in the reflectance control unit 204 when viewed from the occupant 520. As a result, light reflected by the reflectance control unit 204 and traveling toward the occupant 520 is reduced. When the occupant 520 checks the rear of the vehicle 1000 by viewing the image displayed on the display 203, the reflectance control unit 204 is caused to take the first orientation (FIG. 4), thereby preventing bright disturbance light output from the rear of the vehicle 1000 from being incident on the eyes of the occupant 520. The bright disturbance light output from the rear of the vehicle 1000 is light from the headlights of following vehicles, for example. This mechanism can increase the visibility of the image displayed on the display 203.

While the display 203 and the reflectance control unit 204 are disposed in parallel in FIGS. 4 and 5, they may be disposed with a predetermined angle formed therebetween. The normal direction of the reflectance control unit 204, for example, may face upward with respect to the normal direction of the first surface 2031 of the display 203.

Figure 6:
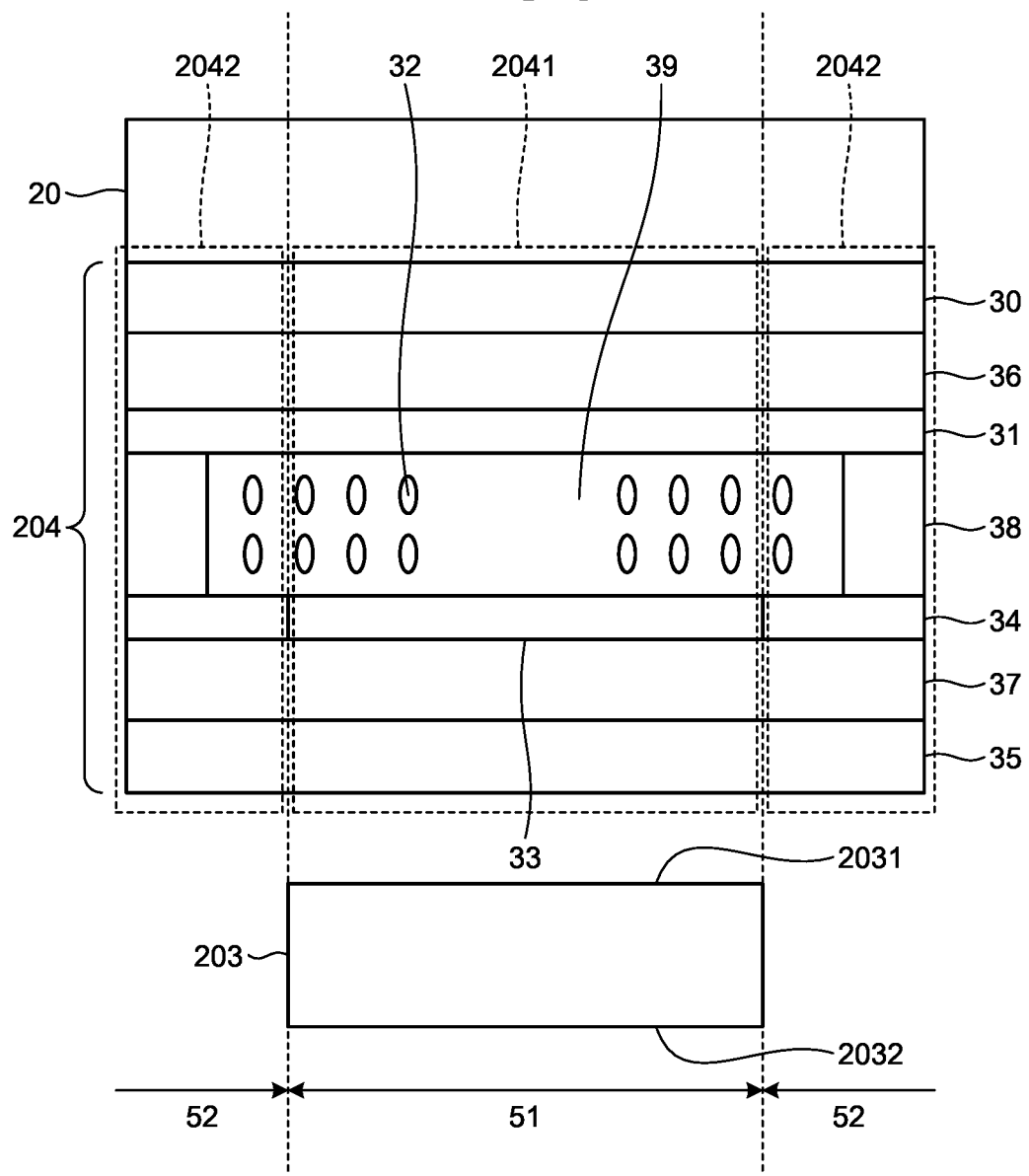
FIG. 6 is a schematic of a reflectance control unit 204 according to the first embodiment.

FIG. 6 is a schematic of the reflectance control unit 204 according to the present embodiment. To facilitate the reader's understanding the positional relation between the components in the display device 200, the glass panel 20 and the display 203 are also illustrated in FIG. 6. As illustrated in FIG. 6, the reflectance control unit 204 is disposed between the display 203 and the glass panel 20. The reflectance control unit 204 is positioned on the first surface 2031 side of the display 203. In other words, the reflectance control unit 204 is positioned on the front surface side of the display 203. In other words, the display 203 is positioned behind the reflectance control unit 204.

In the reflectance control unit 204, a polarization absorption element 30, a first electrode 31, control substances 32, a second electrode 33 and a third electrode 34, and a polarization reflection element 35 are layered in this order along the direction from the glass panel 20 to the display 203 (that is, toward the first surface 2031). In the example illustrated in FIG. 6, the reflectance control unit 204 includes a support plate 36 and a support plate 37. The support plate 36 supports the first electrode 31, and the support plate 37 supports the second electrode 33 and the third electrode 34. As illustrated in FIG. 6, the support plate 36 is positioned between the polarization absorption element 30 and the first electrode 31. The support plate 37 is positioned between the second electrode 33 and the third electrode 34, and the polarization reflection element 35. The first electrode 31, the second electrode 33, and the third electrode 34 may be connected to a power source, which is not illustrated. When the first electrode 31, the second electrode 33, and the third electrode 34 have sufficient rigidity, the reflectance control unit 204 does not necessarily include the support plate 36 or the support plate 37.

The polarization absorption element 30 allows first polarized light polarized in a first polarization direction to pass therethrough and absorbs second polarized light polarized in a second polarization direction different from the first polarization direction. In the present embodiment, the first polarization direction is orthogonal to the second polarization direction. The light transmittance of the polarization absorption element 30 increases as the polarization direction is closer to the first polarization direction, and the light transmittance of the polarization absorption element 30 decreases as the polarization direction is away from the first polarization direction. Similarly to this, the light absorbance of the polarization absorption element 30 increases as the polarization direction is closer to the second polarization direction, and the light absorbance of the polarization absorption element 30 decreases as the polarization direction is away from the second polarization direction. The first polarization direction is not necessarily orthogonal to the second polarization direction. The polarization absorption element 30 is a polarization absorption film, for example.

The reflectance control unit 204 has a first part 2041 and a second part 2042. The first part 2041 is positioned in a first region 51 overlapping the first surface 2031 when viewed in the normal direction of the first surface 2031. The second part 2042 is positioned in a second region 52 surrounding the first region 51. The whole or part of the first region 51 may overlap the first surface 2031. The second region 52 does not necessarily overlap the first surface, and part of the second region 52 may overlap the first surface 2031.

The first electrode 31 has a part positioned in the first region 51 and a part positioned in the second region 52, and these parts are integrally formed. The first electrode 31 is a transparent electrode. The first electrode 31 is an indium tin oxide electrode, for example. The first electrode 31 may be supported by the support plate 36. The support plate 36 is made of transparent material. The support plate 36 is a glass plate, for example. The first electrode 31 may be formed on the support plate 36 by vapor deposition, for example, thereby being supported by the support plate 36.

Figure 7:
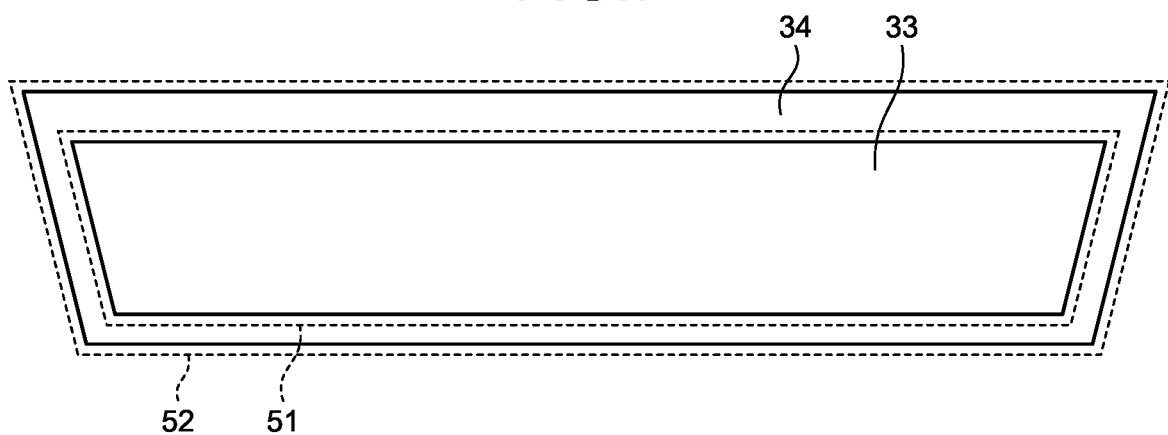
FIG. 7 is a view illustrating an example of arrangement of electrodes in the reflectance control unit 204.

FIG. 7 illustrates an example of arrangement of the second electrode 33 and the third electrode 34 in the reflectance control unit 204. The second electrode 33 is positioned in the first region 51. The third electrode 34 is positioned in the second region 52. In other words, the third electrode 34 according to the present embodiment is disposed surrounding the second electrode 33. The size of the third electrode 34 according to the present embodiment is designed such that the length of the outer circumference of the third electrode 34 is equivalent to that of the first electrode 31. As a result, the area of the part capable of controlling the reflectance can be maximized in the reflectance control unit 204. The length of the outer circumference of the third electrode 34 may be smaller than that of the first electrode 31. The second electrode 33 and the third electrode 34 are transparent electrodes. The second electrode 33 and the third electrode 34 may be made of the same material as that of the first electrode 31. The second electrode 33 and the third electrode 34 are ITO electrodes, for example. The second electrode 33 and the third electrode 34 may be supported by the support plate 37. The support plate 37 is made of transparent material. The support plate 37 may be made of the same material as that of the support plate 36. The support plate 37 is a glass plate, for example. The second electrode 33 and the third electrode 34 may be formed on the support plate 37 by vapor deposition, for example, thereby being supported by the support plate 37.

The control substances 32 are positioned between the first electrode 31 and the second electrode 33 and between the first electrode 31 and the third electrode 34. In the present embodiment, the peripheral part of the first electrode 31 and the peripheral part of the third electrode 34 are coupled and sealed with a sealant 38 to form a space 39. The control substances 32 are positioned in the space 39. The state of the control substances 32 changes depending on potential difference at least one of between the first electrode 31 and the second electrode 33 and between the first electrode 31 and the third electrode 34, whereby the reflectance of the reflectance control unit 204 changes. Specifically, the state of the control substances 32 changes by changing the voltage applied between the first electrode 31 and the second electrode 33, between the first electrode 31 and the third electrode 34, or both of them, whereby the reflectance of the reflectance control unit 204 changes. The control substances 32 are liquid crystal molecules, for example. The control substances 32 may be electrochromic material, for example. When the control substances 32 are electrochromic material, the reflectance control unit 204 does not necessarily include the polarization absorption element 30 or the polarization reflection element 35, which will be described later.

The polarization reflection element 35 allows the first polarized light polarized in the first polarization direction to pass therethrough and reflects the second polarized light polarized in the second polarization direction different from the first polarization direction. In the present embodiment, the first polarization direction is orthogonal to the second polarization direction. The light transmittance of the polarization reflection element 35 increases as the polarization direction is closer to the first polarization direction, and the light transmittance of the polarization reflection element 35 decreases as the polarization direction is away from the first polarization direction. Similarly to this, the light reflectance of the polarization reflection element 35 increases as the polarization direction is closer to the second polarization direction, and the light reflectance of the polarization reflection element 35 decreases as the polarization direction is away from the second polarization direction. When the first polarization direction is not orthogonal to the second polarization direction in the polarization absorption element 30, the first polarization direction may not be orthogonal to the second polarization direction in the polarization reflection element 35. The polarization reflection element 35 is a polarization reflection film, for example.

The following describes the principle that the reflectance of the reflectance control unit 204 changes by changing the voltage applied between the electrodes with reference to FIGS. 8 to 11. In this example, the control substances 32 are liquid crystal molecules. FIGS. 8 to 11 do not illustrate the support plate 36, the support plate 37, the sealant 38, or the third electrode 34.

In the example described below, if no voltage is applied between the first electrode 31 and the second electrode 33, the liquid crystal molecules are arrayed in a manner twisted at 90 degrees from the first electrode 31 toward the second electrode 33. As the voltage applied between the first electrode 31 and the second electrode 33 increases, the liquid crystal molecules are arrayed in the vertical direction along the electric field.

Figure 8:
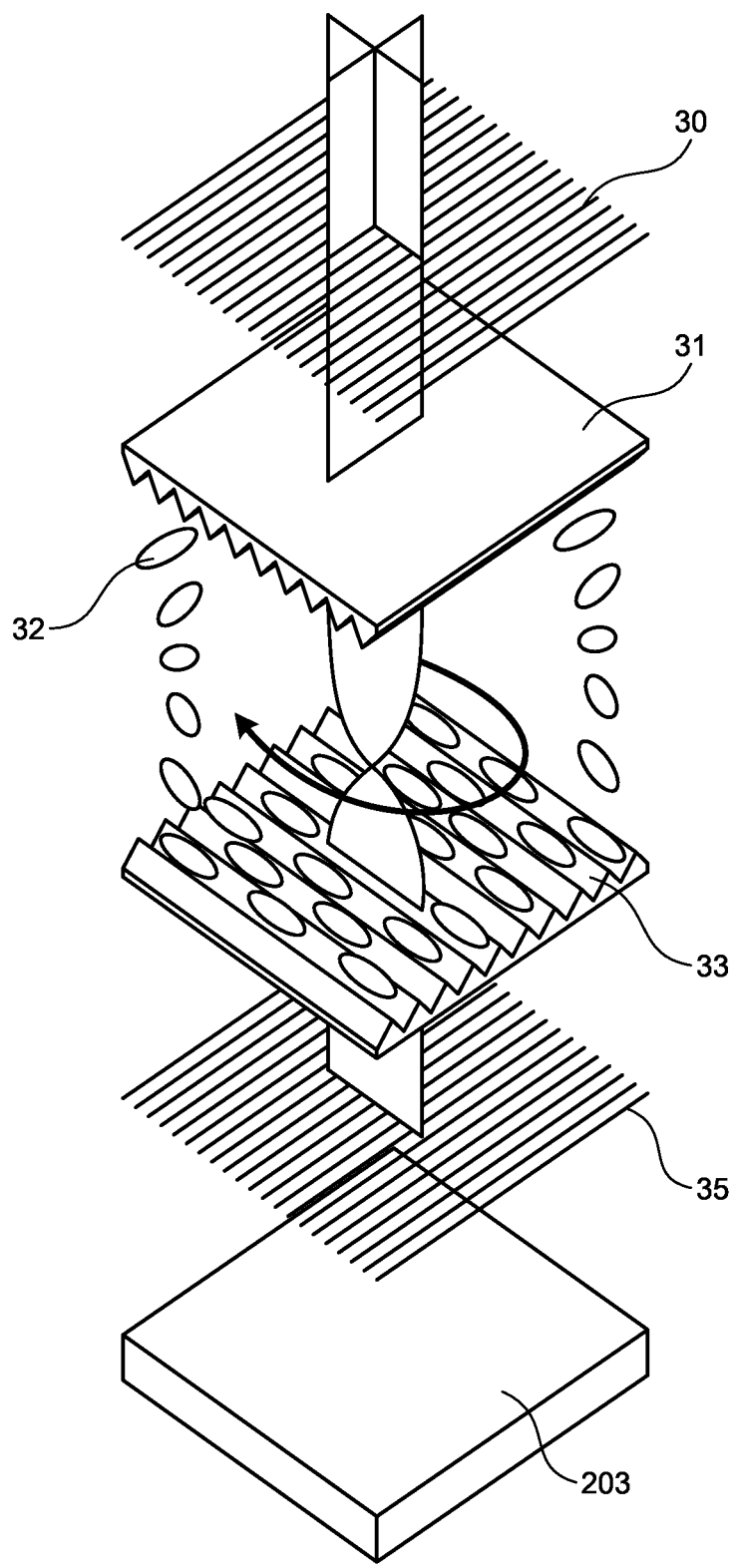
FIG. 8 is a schematic of the reflectance control unit 204 according to the first embodiment when no voltage is applied between the electrodes.
Figure 9:
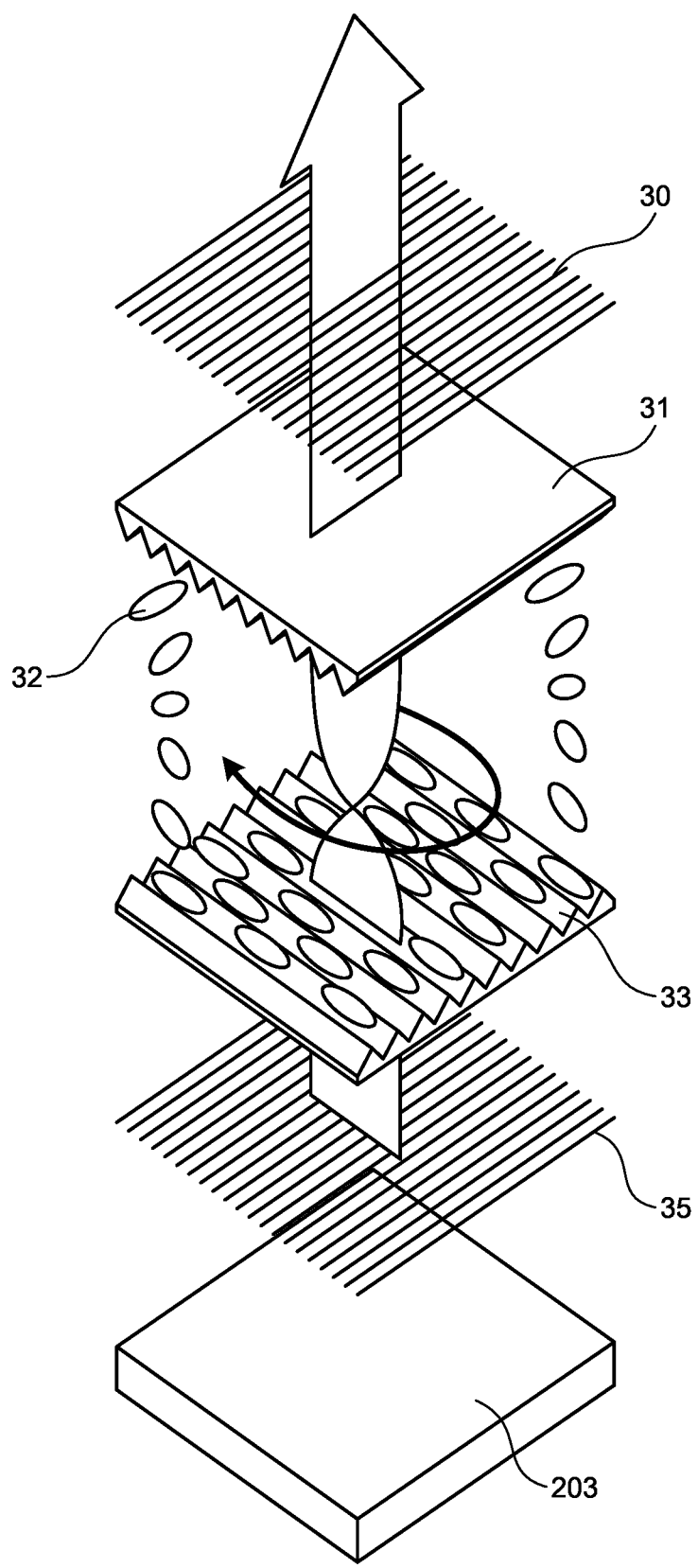
FIG. 9 is another schematic of the reflectance control unit 204 according to the first embodiment when no voltage is applied between the electrodes.

FIGS. 8 and 9 illustrate a state where incident light is reflected by the reflectance control unit 204 when no voltage is applied between the first electrode 31 and the second electrode 33. Specifically, FIG. 8 illustrates a state where the incident light is incident on and reflected by the reflectance control unit 204. FIG. 9 illustrates a state where the reflected light is output from the reflectance control unit 204. Here, it is assumed that the display 203 is OFF. Incident light includes the first polarized light polarized in the first polarization direction and the second polarized light polarized in the second polarization direction different from the first polarization direction. The incident light is incident on the reflectance control unit 204 from the upper side of the drawing. To simplify the explanation, the incident light includes only the first polarized light and the second polarized light. The second polarized light is absorbed by the polarization absorption element 30. Only the first polarized light passes through the polarization absorption element 30 and is incident on the first electrode 31. The incident light travels along a gap between the control substances 32 disposed side by side. In other words, the traveling direction of the first polarized light is twisted at 90 degrees while the first polarized light is traveling from the first electrode 31 to the second electrode 33. As a result, the second polarized light is output from the second electrode 33. The second polarized light is reflected by the polarization reflection element 35 and is incident on the second electrode 33. The traveling direction of the second polarized light is twisted again at 90 degrees while the second polarized light is traveling from the second electrode 33 to the first electrode 31. As a result, the first polarized light is output from the first electrode 31. The first polarized light passes through the polarization absorption element 30 and is output to the outside of the reflectance control unit 204. When viewed from an observer, the incident light including the first polarized light and the second polarized light is incident on the reflectance control unit 204, and only the first polarized light is reflected by the reflectance control unit 204. In other words, in the example illustrated in FIGS. 8 and 9, all the incident first polarized light is converted into the second polarized light, all the second polarized light is reflected by the polarization reflection element 35, and the reflected second polarized light is converted again into the first polarized light and output from the reflectance control unit 204. By applying no voltage between the first electrode 31 and the second electrode 33, for example, a mirror image is reflected in the reflectance control unit 204. The occupant 520 can check the rear of the vehicle 1000 by viewing the mirror image reflected in the reflectance control unit 204.

Figure 10:
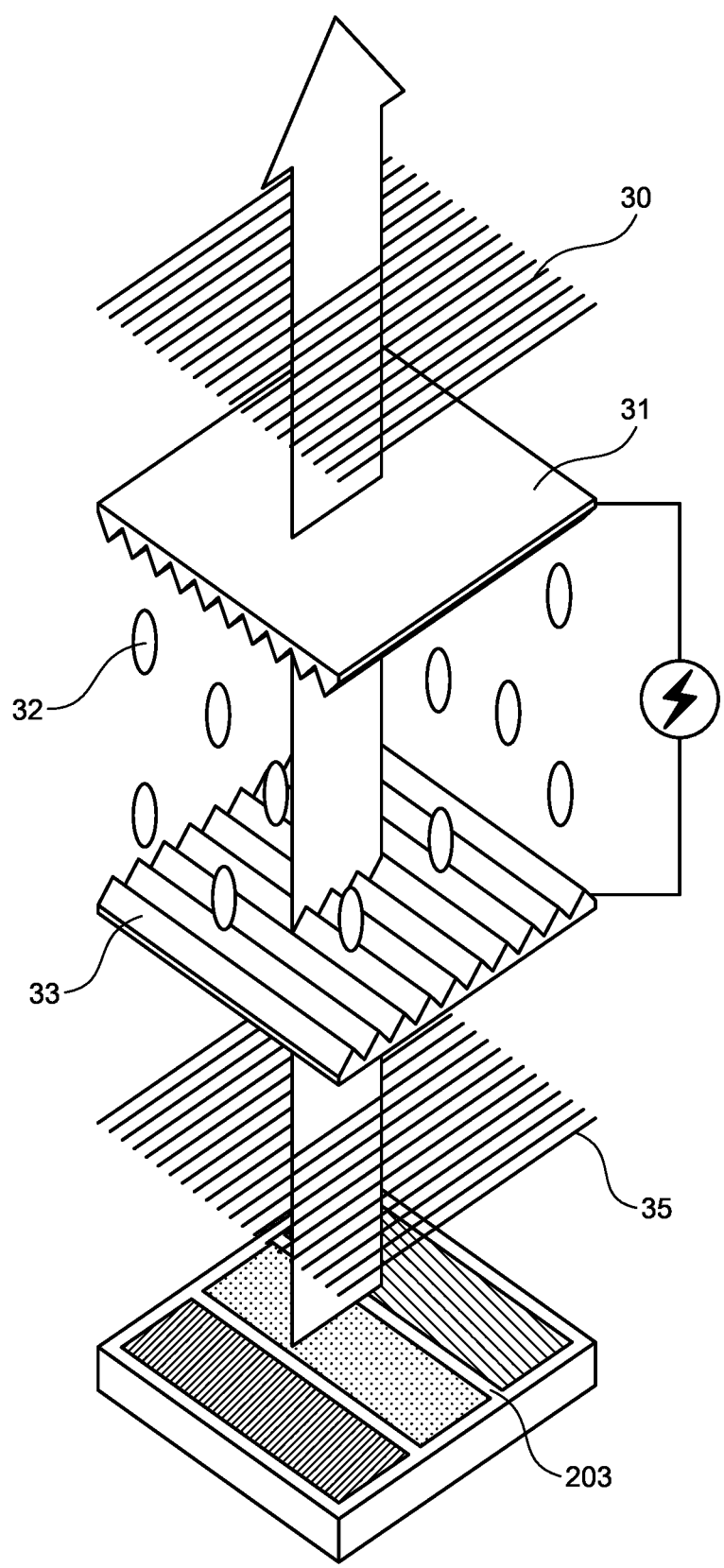
FIG. 10 is a schematic of the reflectance control unit 204 according to the first embodiment when a voltage is applied between the electrodes.

FIG. 10 illustrates a state where light output from the display 203 is output through the reflectance control unit 204 when a first voltage is applied between the first electrode 31 and the second electrode 33. When the first voltage is applied between the first electrode 31 and the second electrode 33, the control substances 32 are arrayed in the vertical direction from the first electrode 31 to the second electrode 33. Here, it is assumed that the display 203 is ON and outputs light including the first polarized light. To simplify the explanation, the light output from the display 203 includes only the first polarized light.

The first polarized light output from the display 203 passes through the polarization reflection element 35 and is incident on the second electrode 33. The first polarized light travels along a gap between the control substances 32 because the control substances 32 are arrayed in the vertical direction. In other words, the traveling direction of the first polarized light does not change while the first polarized light is traveling from the second electrode 33 to the first electrode 31. As a result, the first polarized light is output from the first electrode 31. The first polarized light passes through the polarization absorption element 30 and is output to the outside of the reflectance control unit 204. Consequently, when the first voltage is applied between the first electrode 31 and the second electrode 33, the light output from the display 203 passes through the reflectance control unit 204 without any change and is observed by the observer. By applying the first voltage between the first electrode 31 and the second electrode 33 when the display 203 is ON, the occupant 520 can check the rear of the vehicle by viewing the image displayed on the display 203. In the example illustrated in FIG. 10, all the first polarized light output from the display 203 passes through and is output from the reflectance control unit 204.

A second voltage lower than the first voltage may be applied between the first electrode 31 and the second electrode 33. When the second voltage is applied between the first electrode 31 and the second electrode 33, the control substances 32 are arrayed in a manner twisted at $d_n$ degrees from the first electrode 31 to the second electrode 33. Note that $d_n$ is a value larger than 0 and smaller than 90. Here, it is assumed that the display 203 is OFF. Similarly to the example illustrated in FIGS. 8 and 9, incident light including the first polarized light polarized in the first polarization direction and the second polarized light polarized in the second polarization direction different from the first polarization direction is incident on the reflectance control unit 204. The second polarized light is absorbed by the polarization absorption element 30. Only the first polarized light passes through the polarization absorption element 30 and is incident on the first electrode 31. The traveling direction of the first polarized light is twisted at $d_n$ degrees while the first polarized light is traveling from the first electrode 31 to the second electrode 33. As a result, a third polarized light polarized in a third polarization direction is output from the second electrode 33. The third polarization direction is a direction polarized at $d_n$ degrees with respect to the first polarization direction. Part of the third polarized light is reflected by the polarization reflection element 35 and is incident on the second electrode 33. The traveling direction of the third polarized light is twisted at $-d_n$ degrees while the third polarized light is traveling from the second electrode 33 to the first electrode 31. As a result, the first polarized light is output from the first electrode 31. The first polarized light passes through the polarization absorption element 30 and is output to the outside of the reflectance control unit 204. When viewed from the observer, the incident light including the first polarized light and the second polarized light is incident on the reflectance control unit 204, and only the first polarized light is attenuated and reflected by the reflectance control unit 204. In other words, all the incident first polarized light is converted into the third polarized light, part of the third polarized light is reflected by the polarization reflection element 35, and the reflected third polarized light is converted again into the first polarized light and output from the reflectance control unit 204 in this example. In other words, this example is the same as the example described with reference to FIGS. 8 and 9 in that only the first polarized light is reflected by the reflectance control unit 204. This example, however, has lower reflectance than the example illustrated in FIGS. 8 and 9.

By applying the second voltage between the first electrode 31 and the second electrode 33, the occupant 520 can check the rear of the vehicle 1000 by viewing the mirror image reflected in the reflectance control unit 204. In addition, lowering the reflectance of the mirror image may possibly facilitate the occupant 520's visually recognizing the mirror image. When a high beam from following vehicles is reflected by the reflectance control unit 204, for example, lowering the reflectance of the reflectance control unit 204 reduces glare felt by the occupant 520 and facilitates the occupant 520's visually recognizing the mirror image.

In the description above, the control substances 32 are liquid crystal molecules. Also in the case where the control substances 32 are electrochromic material, changing the voltage applied between the electrodes changes the reflectance of the reflectance control unit 204. By applying a voltage between the first electrode 31 and the second electrode 33, for example, the state of the control substances 32 serving as electrochromic material changes, and the transmittance of the space 39 accommodating the control substances 32 decreases. As a result, the amount of light incident on the polarization reflection element 35 decreases, whereby the reflectance of the reflectance control unit 204 decreases. When no voltage is applied between the first electrode 31 and the second electrode 33, for example, the transmittance for incident light of the space 39 accommodating the control substances 32 may be 80% or higher. When a voltage is applied between the first electrode 31 and the second electrode 33, the transmittance for incident light of the space 39 accommodating the control substances 32 may be 50% or lower. The transmittance of the space 39 accommodating the control substances 32 may decrease by applying a voltage between the first electrode 31 and the second electrode 33, for example. When the control substances 32 serving as electrochromic material change between a metallic state and a transparent state, the control substances 32 change into the metallic state by applying a voltage between the first electrode 31 and the second electrode 33, for example. At this time, the control substances 32 themselves reflect incident light. Consequently, the reflectance of the reflectance control unit 204 can be changed only by changing the ratio of the control substances 32 in the metallic state, for example. In this case, the reflectance control unit 204 does not necessarily include the polarization absorption element 30 or the polarization reflection element 35. The electrochromic material is not explained herein in detail because it can be provided simply by using publicly known technologies.

In the present embodiment, the electrode facing the first electrode 31 with the control substances 32 interposed therebetween are divided into the second electrode 33 and the third electrode 34. With this configuration, the present embodiment is able to differentiate the voltage to be applied between the first electrode 31 and the second electrode 33 from the voltage to be applied between the first electrode 31 and the third electrode 34. Thus, the present embodiment can independently control the voltage to be applied between the first electrode 31 and the second electrode 33 and the voltage to be applied between the first electrode 31 and the third electrode 34. As a result, the present embodiment can independently control the reflectance of the first part 2041 and the reflectance of the second part 2042. In other words, the present embodiment can differentiate the reflectance of the first part 2041 from the reflectance of the second part 2042. With this configuration, the present embodiment can control the reflectance of the reflectance control unit 204 for each region. Consequently, the present embodiment is more likely to appropriately control the reflectance of the reflectance control unit 204 depending on the environment around the vehicle 1000, for example.

Figure 11:
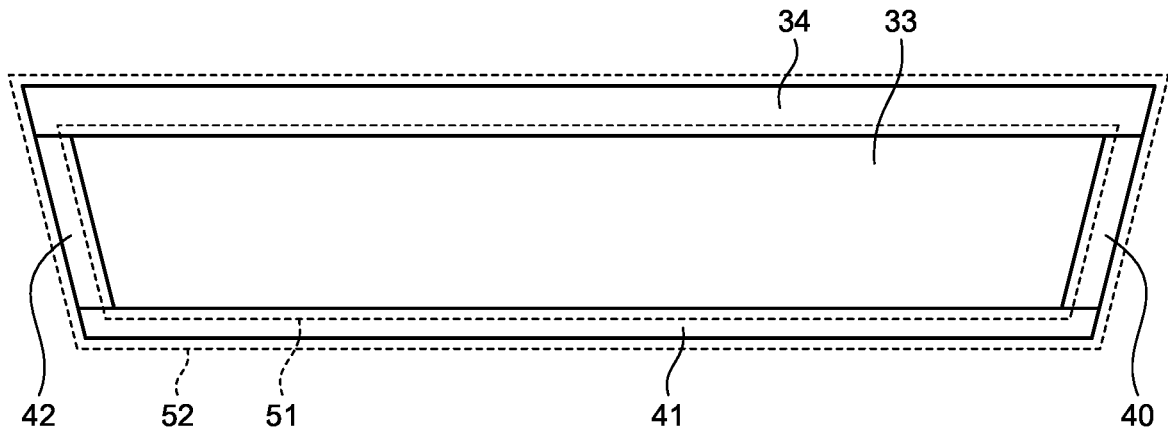
FIG. 11 is a view illustrating another example of arrangement of the electrodes in the reflectance control unit 204.

The third electrode 34 according to the present embodiment is provided surrounding the second electrode 33. As illustrated in FIG. 11, the second electrode 33 may be surrounded by a plurality of electrodes. In the example illustrated in FIG. 11, the rectangular second electrode 33 is surrounded by four electrodes (the third electrode 34, a fourth electrode 40, a fifth electrode 41, and a sixth electrode 42) corresponding to the respective four sides. In other words, the reflectance control unit 204 may include the fourth electrode 40, the fifth electrode 41, and the sixth electrode 42 besides the second electrode 33 and the third electrode 34 as the electrodes facing the first electrode 31. The fourth electrode 40, the fifth electrode 41, and the sixth electrode 42 are positioned in the second region 52. When viewed in the normal direction of the first surface 2031, for example, the third electrode 34 is positioned on the upper side of the second electrode 33, the fourth electrode 40 is positioned on the right side of the second electrode 33, the fifth electrode 41 is positioned on the lower side of the second electrode 33, and the sixth electrode 42 is positioned on the left side of the second electrode 33. The control substances 32 are positioned between the first electrode 31 and the fourth electrode 40, between the first electrode 31 and the fifth electrode 41, and between the first electrode 31 and the sixth electrode 42.

The state of the control substances 32 changes depending on potential difference at least one of between the first electrode 31 and the fourth electrode 40, between the first electrode 31 and the fifth electrode 41, and between the first electrode 31 and the sixth electrode 42, whereby the reflectance of the reflectance control unit 204 changes. In this example, the third electrode 34, the fourth electrode 40, the fifth electrode 41, and the sixth electrode 42 are included in the second part 2042. The fourth electrode 40, the fifth electrode 41, and the sixth electrode 42 may be connected to the power source, which is not illustrated. In this example, the present embodiment can independently control the voltage applied between the first electrode 31 and the second electrode 33, the voltage applied between the first electrode 31 and the third electrode 34, the voltage applied between the first electrode 31 and the fourth electrode 40, the voltage applied between the first electrode 31 and the fifth electrode 41, and the voltage applied between the first electrode 31 and the sixth electrode 42. In other words, the voltages applied between the first electrode 31 and the other electrodes can be made different from one another. The voltage applied between the first electrode 31 and the third electrode 34, the voltage applied between the first electrode 31 and the fourth electrode 40, the voltage applied between the first electrode 31 and the fifth electrode 41, and the voltage applied between the first electrode 31 and the sixth electrode 42 may be equal to one another. Also in this configuration, the present embodiment can independently control the reflectance of the first part 2041 and the reflectance of the second part 2042. In other words, the present embodiment can make the reflectance of the first part 2041 different from the reflectance of the second part 2042. With this configuration, the present embodiment can control the reflectance of the reflectance control unit 204 for each smaller region. Consequently, the present embodiment is more likely to appropriately control the reflectance of the reflectance control unit 204 depending on the environment around the vehicle 1000, for example.

Figure 12:
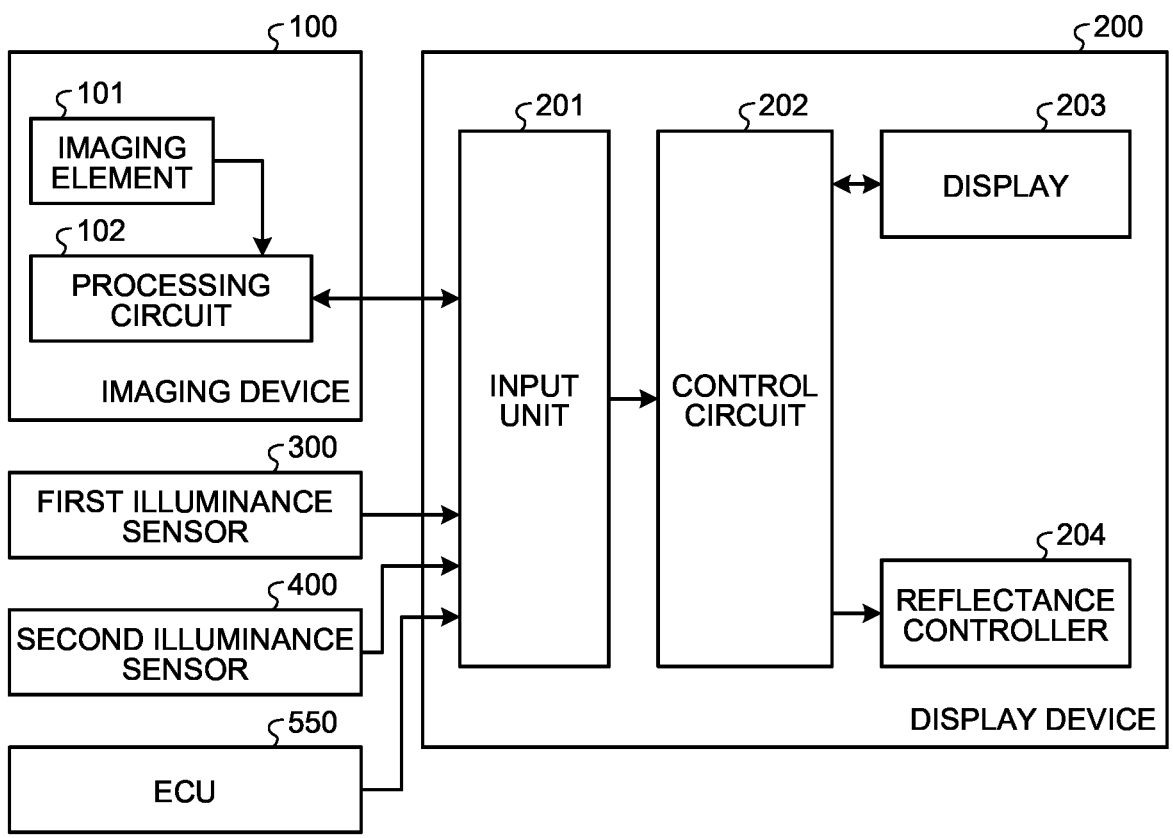
FIG. 12 is a block diagram of a display system 1 according to the first embodiment.

FIG. 12 is a block diagram of the display system 1 according to the first embodiment. The display system 1 according to the present embodiment includes the imaging device 100, the display device 200, the first illuminance sensor 300, and the second illuminance sensor 400.

The imaging device 100 includes an imaging element 101 and a processing circuit 102. The imaging element 101 is a complementary metal oxide semiconductor imaging element or a charge coupled devices imaging element, for example. The imaging element 101 converts light entering through a lens into electrical signals and outputs the signals to a signal processing circuit, which is not illustrated. The signal processing circuit performs signal processing, such as A/D conversion and noise reduction, on the signals received from the imaging element 101 and outputs the signals to the processing circuit 102 as image signals.

The processing circuit 102 can perform various kinds of video processing, such as gradation correction, color correction, and contour correction, on the image signals received from the imaging element 101. The processing circuit 102 compresses the image signals subjected to the video processing based on a predetermined compression system and transmits the compressed image signals to the display device 200.

The processing circuit 102 according to the present embodiment includes a processor and a memory. The processing circuit 102 implements various functions by the processor executing a predetermined computer program stored in the memory or a storage, for example. The processor includes a central processing unit, a digital signal processor, or a micro processing unit, for example. The memory includes a read only memory or a random access memory, for example. The storage includes a solid state drive, a hard disk drive, an optical disc device, or a memory card, for example.

The display device 200 includes an input unit 201, the control circuit 202, the display 203, and the reflectance control unit 204.

The input unit 201 is an interface that inputs the image signals output from the processing circuit 102, the first illuminance information output from the first illuminance sensor 300, the second illuminance information output from the second illuminance sensor 400, and speed information and reverse information output from an ECU 550 of the vehicle 1000 to the display device 200. The speed information indicates the speed of the vehicle 1000. The reverse information indicates whether the vehicle 1000 is reversing. The display device 200 may include the input units 201 individually for the processing circuit 102, the first illuminance sensor 300, the second illuminance sensor 400, and the ECU 550. The speed information and the reverse information according to the present embodiment are output from the ECU 550 and input to the display device 200 via a controller area network.

The control circuit 202 performs processing based on the image signals received from the imaging device 100, the first illuminance information received from the first illuminance sensor 300, the second illuminance information received from the second illuminance sensor 400, and the speed information and the reverse information received from the ECU 550. In the processing, the control circuit 202 controls the operations of the display 203 and the reflectance control unit 204. Specifically, the control circuit 202 controls the reflectance of the second part 2042 of the reflectance control unit 204 based on at least one of the speed information and the reverse information. The control circuit 202 may control the reflectance of the first part 2041 of the reflectance control unit 204. The control circuit 202 may individually control the reflectance of the first part 2041 and the reflectance of the second part 2042. When the occupant 520 checks the rear of the vehicle 1000 by viewing the mirror image reflected in the reflectance control unit 204, the control circuit 202 may turn off the display 203 and set the reflectance of the first part 2041 to high reflectance. The high reflectance is 45%, for example. When the occupant 520 checks the rear of the vehicle by viewing the image displayed on the display 203, the control circuit 202 may turn on the display 203 and set the reflectance of the first part 2041 to low reflectance. The low reflectance is sufficiently low to allow the occupant 520 to visually recognize the display 203 through the first part 2041. The low reflectance is lower than 10%, for example. The processing performed by the control circuit 202 will be described later in greater detail.

The control circuit 202 according to the present embodiment includes a processor and a memory. The control circuit 202 implements various functions by the processor executing a predetermined computer program stored in the memory or a storage, for example. The processor includes a CPU, a DSP, or an MPU, for example. The memory includes a ROM or a RAM, for example. The storage includes an SSD, an HDD, an optical disc device, or a memory card, for example.

Figure 13:
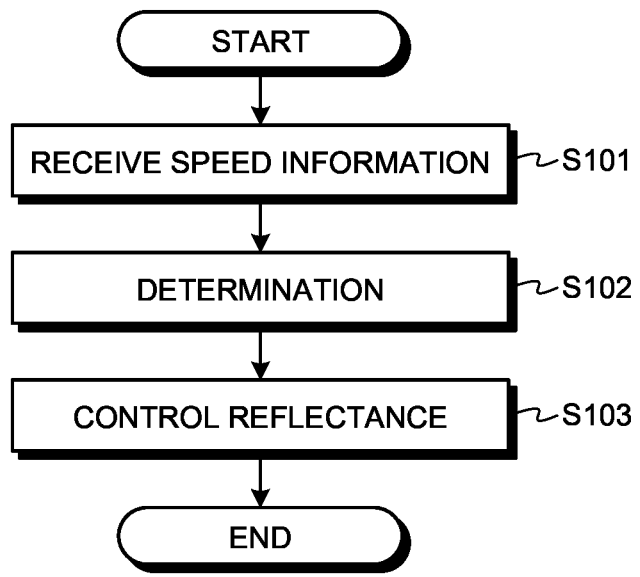
FIG. 13 is a flowchart of controlling the reflectance of the reflectance control unit 204 performed by a control circuit 202 according to the first embodiment.

The following describes the processing performed by the control circuit 202 according to the present embodiment with reference to FIG. 13. FIG. 13 is a flowchart of controlling the reflectance of the reflectance control unit 204 performed by the control circuit 202.

The control circuit 202 according to the present embodiment controls the reflectance of the second part 2042 of the reflectance control unit 204 based on at least one of the speed information and the reverse information. Specifically, the control circuit 202 controls the reflectance of the second part 2042 of the reflectance control unit 204 based on the speed information. More specifically, the control circuit 202 controls the reflectance control unit 204 based on the speed information such that the reflectance of the second part 2042 decreases as the speed of the vehicle increases. Controlling the reflectance of the reflectance control unit 204 is referred to as reflectance control. The following describes the specific contents of reflectance control.

At Step S101, the control circuit 202 receives the speed information from the ECU 550. At Step S102, the control circuit 202 performs determination for determining how it performs reflectance control based on the acquired speed information. The control circuit 202 may have a table indicating determination criteria and perform the processing at Step S102 based on the table. At Step S103, the control circuit 202 controls the reflectance of the reflectance control unit 204 based on the result of determination. The control circuit 202, for example, may output signals indicating the voltage value based on the result of determination to the power source connected to the electrodes of the reflectance control unit 204. Based on the signals received from the control circuit 202, the power source may control the voltages applied to the electrodes. The control circuit 202 may periodically receive the speed information from the ECU 550 and repeatedly perform the processing from Step S101 to Step S103.

The following describes the determination at Step S102 performed when the display 203 is OFF in greater detail. In this case, the occupant 520 checks the rear of the vehicle 1000 by viewing the mirror image reflected in the reflectance control unit 204. The control circuit 202 determines whether the speed of the vehicle 1000 is equal to or higher than a first threshold based on the speed information. The first threshold is 70 kilometers per hour, for example. When the control circuit 202 determines that the speed of the vehicle 1000 is lower than the first threshold, the control circuit 202 determines to set the reflectance of the second part 2042 to first reflectance. The first reflectance is the high reflectance, for example. The high reflectance is 45%, for example. By setting the reflectance of the second part 2042 to the first reflectance, a drive circuit (not illustrated) disposed near the display 203 to drive the display 203 can be prevented from being visually recognized by the observer through the reflectance control unit 204. The drive circuit is disposed in the second region, for example. In addition, the frame of the housing 18 need not have a large area because the drive circuit need not be covered with the housing 18. Consequently, the appearance of the display device 200 can be made more favorable for the observer without deteriorating the functions of the display device 200. When the display 203 is OFF, the reflectance of the first part 2041 is set to the first reflectance. In other words, when the display 203 is OFF, the control circuit 202 may control the reflectance control unit 204 such that the reflectance of the first part 2041 is equal to that of the second part 2042.

By contrast, when the control circuit 202 determines that the speed of the vehicle 1000 is equal to or higher than the first threshold, the control circuit 202 determines to set the reflectance of the second part 2042 to second reflectance lower than the first reflectance. The control circuit 202, for example, determines to set the reflectance of the second part 2042 to intermediate reflectance. The intermediate reflectance is lower than the high reflectance and higher than the low reflectance. The intermediate reflectance is 10% or higher and lower than 45%, for example.

Also in this case, the drive circuit disposed near the display 203 to drive the display 203 can be prevented from being visually recognized by the observer through the reflectance control unit 204. In addition, this case has the advantageous effects described below.

When the occupant 520 checks the rear of the vehicle 1000 by viewing the mirror image reflected in the reflectance control unit 204 while the vehicle 1000 is traveling at high speed, the view reflected in the second part 2042 seems to flow rearward faster than the view reflected in the first part 2041 to the occupant 520 when not only the reflectance of the first part 2041 but also that of the second part 2042 are set to the high reflectance. In this case, it may possibly be difficult for the occupant 520 to check the view reflected in the second part 2042. In addition, keeping looking at the display device 200 in this state may possibly be a burden on the occupant 520. To address this, the present embodiment sets the reflectance of the second part 2042 to equal to or lower than the first reflectance when the speed of the vehicle 1000 is determined to be equal to or higher than the first threshold. As a result, the mirror image is less likely to be reflected in the second part 2042. This mechanism facilitates the occupant 520's concentrating on viewing the image reflected in the first part 2041. Consequently, the occupant 520 can check the rear of the vehicle 1000 without any burden.

When the control circuit 202 determines that the speed of the vehicle 1000 is equal to or higher than a second threshold larger than the first threshold based on the speed information, the control circuit 202 determines to set the reflectance of the second part 2042 to lower reflectance than in the case where it determines that the speed of the vehicle 1000 is equal to or higher than the first threshold and lower than the second threshold. In this example, when the control circuit 202 determines that the speed of the vehicle 1000 is higher than the first threshold and equal to or lower than the second threshold, for example, the control circuit 202 determines to set the reflectance of the second part 2042 to a value within a first reflectance range. When the control circuit 202 determines that the speed of the vehicle 1000 is equal to or higher than the second threshold, the control circuit 202 determines to set the reflectance of the second part 2042 to a value within a second reflectance range. The second threshold is 80 kilometers per hour, for example. The first reflectance range is a range of values of 25% or higher and lower than 45%, for example. The second reflectance range is a range of values of 10% or higher and lower than 25%, for example. The control circuit 202 may determine to set the reflectance of the second part 2042 based on the speed information such that the reflectance of the second part 2042 decreases as the speed of the vehicle 1000 increases. This mechanism makes the mirror image less likely to be reflected in the second part 2042. Consequently, the occupant 520 can check the rear of the vehicle 1000 without any burden.

When the control circuit 202 determines that the speed of the vehicle 1000 is equal to or higher than a third threshold larger than the first threshold based on the speed information, for example, the control circuit 202 may switch the display 203 from OFF to ON. The third threshold is an example of a second speed threshold. The third threshold is 90 kilometers per hour, for example. The third threshold may be the same as or different from the second threshold. The occupant 520 may more easily check the rear of the vehicle 1000 by viewing the image displayed on the display 203 than by viewing the mirror image reflected in the reflectance control unit 204 depending on the environment around the vehicle 1000, for example. Examples of this case include, but are not limited to, when the environment around the vehicle 1000 is dark, such as traveling at night and traveling in a tunnel, when, by contrast, the environment around the vehicle 1000 is too bright and glaring for the occupant 520 to check the mirror image, etc. When the speed of the vehicle 1000 is high, the occupant 520 should check the rear of the vehicle 1000 with higher concentration. When the speed of the vehicle 1000 is higher than the third threshold, the occupant 520 can more easily check the rear of the vehicle 1000 by switching the display 203 from OFF to ON. Consequently, the occupant 520 can check the rear of the vehicle 1000 without any burden.

When the control circuit 202 determines that the speed of the vehicle 1000 is equal to or higher than a fourth threshold larger than the first threshold based on the speed information, for example, the control circuit 202 may switch the display 203 from OFF to ON and display a dark image in which a peripheral part is darkly displayed on the display 203. The fourth threshold is an example of a first speed threshold. The fourth threshold is 90 kilometers per hour, for example. The fourth threshold may be the same as at least one of the second threshold and the third threshold or different from both the second threshold and the third threshold. The field of view checkable by the occupant 520 becomes narrower as the speed of the vehicle 1000 increases. When the part that displays the view has a large area in the display device 200, looking at the part may possibly be a burden on the occupant 520 when checking the rear of the vehicle 1000. As described above, by reducing the area for displaying the view of the rear of the vehicle 1000 on the display 203 compared with the case where the mirror image is reflected in the whole area of the first part 2041, the occupant 520 can check the rear of the vehicle 1000 without any burden.

When the control circuit 202 determines that the speed of the vehicle 1000 is lower than the first threshold, the control circuit 202 may determine to set the reflectance of the second part 2042 to the intermediate reflectance. When the display 203 is OFF, for example, the reflectance of the first part 2041 is set to the high reflectance. In other words, when the display 203 is OFF, the control circuit 202 may control the reflectance control unit 204 such that the reflectance of the second part 2042 is lower than that of the first part 2041. This mechanism makes the state inside the vehicle less likely to be reflected in the second part 2042, thereby preventing the occupant 520 from being distracted by the mirror image reflected in the second part 2042. Consequently, the occupant 520 can check the rear of the vehicle 1000 without any burden.

The following describes the determination at Step S102 performed when the display 203 is ON in greater detail. In this case, the occupant 520 checks the rear of the vehicle 1000 by viewing the image displayed on the display 203. Similarly to the case where the display 203 is OFF, the control circuit 202 determines whether the speed of the vehicle 1000 is equal to or higher than the first threshold based on the speed information. When the control circuit 202 determines that the speed of the vehicle 1000 is lower than the first threshold, the control circuit 202 determines to set the reflectance of the second part 2042 to the first reflectance. By setting the reflectance of the second part 2042 to the first reflectance, the drive circuit (not illustrated) disposed near the display 203 to drive the display 203 can be prevented from being visually recognized by the observer through the reflectance control unit 204. In addition, the frame of the housing 18 need not have a large area because the drive circuit need not be covered with the housing 18. Consequently, the appearance of the display device 200 can be made more favorable for the observer without deteriorating the functions of the display device 200.

Similarly to the case where the display 203 is OFF, the control circuit 202 controls the reflectance control unit 204 based on the speed information such that the reflectance of the second part 2042 decreases as the speed of the vehicle increases. When the control circuit 202 determines that the speed of the vehicle 1000 is equal to or higher than the first threshold, the control circuit 202 determines to set the reflectance of the second part 2042 to the second reflectance lower than the first reflectance. The control circuit 202, for example, determines to set the reflectance of the second part 2042 to the intermediate reflectance. When the display 203 is ON, the reflectance of the first part 2041 is set to the low reflectance. In other words, when the display 203 is ON, the control circuit 202 controls the reflectance control unit 204 such that the reflectance of the second part 2042 is higher than that of the first part 2041 in both cases where the speed of the vehicle 1000 is determined to be equal to or higher than the first threshold and where it is determined to be lower than the first threshold.

Also in this case, the drive circuit disposed near the display 203 to drive the display 203 can be prevented from being visually recognized by the observer through the reflectance control unit 204. In addition, this case has the advantageous effects described below.

When the occupant 520 checks the rear of the vehicle 1000 by viewing the image displayed on the display 203 while the vehicle 1000 is traveling at high speed, the view reflected in the second part 2042 seems to flow rearward faster than the view displayed on the display 203 to the occupant 520 when the reflectance of the second part 2042 is set to the high reflectance. In this case, the occupant 520 may possibly be distracted by the view reflected in the second part 2042 that originally need not be checked. As a result, it may possibly be difficult for the occupant 520 to concentrate on viewing only the image displayed on the display 203 through the first part 2041. To address this, the present embodiment sets the reflectance of the second part 2042 to equal to or lower than the first reflectance when the speed of the vehicle 1000 is determined to be equal to or higher than the first threshold. As a result, the mirror image is less likely to be reflected in the second part 2042. This mechanism facilitates the occupant 520's concentrating on viewing only the image displayed on the display 203. Consequently, the occupant 520 can check the rear of the vehicle 1000 without any burden.

Similarly to the case where the display 203 is OFF, when the control circuit 202 determines that the speed of the vehicle 1000 is equal to or higher than the second threshold larger than the first threshold based on the speed information, the control circuit 202 may determine to set the reflectance of the second part 2042 to lower reflectance than in the case where it determines that the speed of the vehicle 1000 is equal to or higher than the first threshold and lower than the second threshold. This mechanism makes the mirror image less likely to be reflected in the second part 2042. Consequently, the occupant 520 can check the rear of the vehicle 1000 without any burden.

When the control circuit 202 determines that the speed of the vehicle 1000 is equal to or higher than the first threshold, for example, the control circuit 202 may determine whether the speed of the vehicle 1000 is equal to or higher than the fourth threshold larger than the first threshold based on the speed information. When the control circuit 202 determines that the speed of the vehicle 1000 is equal to or higher than the fourth threshold, the control circuit 202 may determine to set the reflectance of the second part 2042 to equal to or lower than the first reflectance and display a dark image in which a peripheral part is darkly displayed on the display 203. The field of view checkable by the occupant 520 becomes narrower as the speed of the vehicle 1000 increases. When the part that displays the view has a large area on the display device 200, looking at the part may possibly be a burden on the occupant 520 when checking the rear of the vehicle 1000. As described above, by reducing the area for displaying the view of the rear of the vehicle 1000 on the display 203, the occupant 520 can check the rear of the vehicle 1000 without any burden.

Regardless of whether the display 203 is OFF or ON, for example, the control circuit 202 can perform the control described below. The control circuit 202 may control the reflectance of the second part 2042 of the reflectance control unit 204 based on the speed information and the first illuminance information. The control circuit 202 may set the reflectance of the second part 2042 to equal to or lower than the first reflectance only when the control circuit 202 determines that the speed of the vehicle 1000 is equal to or higher than the first threshold and that the traveling environment for the vehicle 1000 is daytime based on the first illuminance information. When the control circuit 202 determines that the speed of the vehicle 1000 is equal to or higher than the first threshold and that the traveling environment for the vehicle 1000 is nighttime, for example, the control circuit 202 may set the reflectance of the second part 2042 to the high reflectance. When the traveling environment for the vehicle 1000 is nighttime, the mirror image reflected in the second part 2042 is dark. As a result, the occupant 520 is less likely to be distracted by the view reflected in the second part 2042 while the vehicle 1000 is traveling at high speed. When the first sensor value included in the first illuminance information is equal to or higher than a daytime illuminance threshold, for example, the control circuit 202 may determine that the traveling environment for the vehicle 1000 is daytime. When the first sensor value is lower than the daytime illuminance threshold, the control circuit 202 may determine that the traveling environment for the vehicle 1000 is nighttime.

The examples of the speeds of the first to the fourth thresholds have been described on the assumption that the vehicle 1000 is used in Japan where the legal speed limit is 100 kilometers per hour. The speeds set as the first to the fourth thresholds may vary depending on countries where the vehicle 1000 is used. When the vehicle 1000 is used in a country where the legal speed limit is 300 kilometers per hour, for example, the first threshold may be 100 kilometers per hour, and the second, the third, and the fourth thresholds may be 200 kilometers per hour.

Second Embodiment

The display system according to a second embodiment is described below. The display system according to the present embodiment is different from the first embodiment in the operations of the control circuit 202. The other configuration is the same as that of the display system 1 according to the first embodiment. The same components as those of the display system 1 according to the first embodiment are denoted by like reference numerals, and explanation thereof is omitted.

Figure 14:
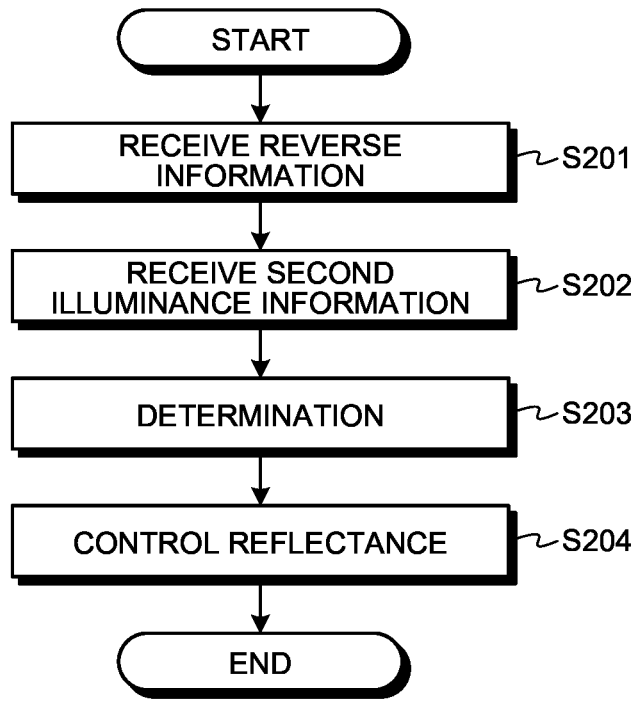
FIG. 14 is a flowchart of controlling the reflectance of the reflectance control unit 204 performed by the control circuit 202 according to a second embodiment.

The following describes the processing performed by the control circuit 202 according to the present embodiment with reference to FIG. 14. FIG. 14 is a flowchart of controlling the reflectance of the reflectance control unit 204 performed by the control circuit 202.

The control circuit 202 according to the present embodiment controls the reflectance of the second part 2042 of the reflectance control unit 204 based on the reverse information and the second illuminance information. Controlling the reflectance of the reflectance control unit 204 is referred to as reflectance control.

At Step S201, the control circuit 202 receives the reverse information from the ECU 550. At Step S202, the control circuit 202 receives the second illuminance information from the second illuminance sensor 400. At Step S203, the control circuit 202 performs determination for determining how it performs reflectance control based on the acquired reverse information and the acquired second illuminance information. The control circuit 202 may have a table indicating determination criteria and perform the processing at Step S203 based on the table. At Step S204, the control circuit 202 controls the reflectance of the reflectance control unit 204 based on the result of determination. The control circuit 202, for example, may output signals indicating the voltage value based on the result of determination to the power source connected to the electrodes of the reflectance control unit 204. Based on the signals received from the control circuit 202, the power source may control the voltages applied to the electrodes. The control circuit 202 may periodically receive the reverse information from the ECU 550 and the second illuminance information from the second illuminance sensor 400 and repeatedly perform the processing from Step S201 to Step S204.

The following describes the determination at Step S203 in greater detail. The control circuit 202 determines whether the vehicle 1000 is reversing based on the reverse information. When the control circuit 202 determines that the vehicle 1000 is not reversing, the control circuit 202 determines to set the reflectance of the second part 2042 to the high reflectance. This control is performed in common regardless of whether the display 203 is OFF or ON. By setting the reflectance of the second part 2042 to the high reflectance, the drive circuit (not illustrated) disposed near the display 203 to drive the display 203 can be prevented from being visually recognized by the observer through the reflectance control unit 204. In addition, the frame of the housing 18 need not have a large area because the drive circuit need not be covered with the housing 18. Consequently, the appearance of the display device 200 can be made more favorable for the observer without deteriorating the functions of the display device 200. When the display 203 is OFF, the reflectance of the first part 2041 is set to the first reflectance. In other words, when the display 203 is OFF, the control circuit 202 may control the reflectance control unit 204 such that the reflectance of the first part 2041 is equal to that of the second part 2042. When the control circuit 202 determines that the vehicle 1000 is reversing, the control circuit 202 determines whether the illuminance of the rear of the vehicle is equal to or higher than a first illuminance threshold based on the second illuminance information. When the control circuit 202 determines that the illuminance of the rear of the vehicle is lower than the first illuminance threshold, the control circuit 202 determines to set the reflectance of the second part 2042 to the first reflectance. Also in this case, the appearance of the display device 200 can be made more favorable for the observer without deteriorating the functions of the display device 200.

When the control circuit 202 determines that the vehicle 1000 is reversing and that the illuminance of the rear of the vehicle 1000 is equal to or higher than the first illuminance threshold, the control circuit 202 determines to set the reflectance of the second part 2042 to the second reflectance lower than the first reflectance. The control circuit 202, for example, determines to set the reflectance of the second part 2042 to the intermediate reflectance. This control is performed in common regardless of whether the display 203 is OFF or ON. When the display 203 is ON, the reflectance of the first part 2041 is set to the low reflectance. In other words, when the display 203 is ON, the control circuit 202 controls the reflectance control unit 204 such that the reflectance of the second part 2042 is higher than that of the first part 2041 in both cases where the speed of the vehicle 1000 is determined to be equal to or higher than the first illuminance threshold and where it is determined to be lower than the first illuminance threshold.

Also in this case, the drive circuit disposed near the display 203 to drive the display 203 can be prevented from being visually recognized by the observer through the reflectance control unit 204. In addition, this case has the advantageous effects described below.

When the illuminance of the rear of the vehicle 1000 is high, and the occupant 520 checks the rear of the vehicle 1000 by viewing the mirror image reflected in the reflectance control unit 204, a large amount of reflected light may possibly enter into the eyes of the occupant 520 when not only the reflectance of the first part 2041 but also that of the second part 2042 are set to the high reflectance. When the vehicle 1000 is reversed in this state, the vehicle 1000 travels toward the direction having high illuminance, thereby dazzling the occupant 520. As a result, it may possibly be difficult for the occupant 520 to check the rear of the vehicle 1000. To address this, the present embodiment sets the reflectance of the second part 2042 to equal to or lower than the second reflectance when the vehicle 1000 is determined to be reversing. As a result, the amount of light reflected by the second part 2042 is reduced, and the occupant 520 is less likely to be dazzled. Consequently, the occupant 520 can check the rear of the vehicle 1000 without any burden.

Let us assume a case where the reflectance of the second part 2042 is set to the high reflectance when the illuminance of the rear of the vehicle 1000 is high, and the occupant 520 checks the rear of the vehicle 1000 by viewing the image displayed on the display 203. When the vehicle 1000 is reversed in this state, the vehicle 1000 travels toward the direction having high illuminance. As a result, the light reflected by the second part 2042 is more likely to enter into the eyes of the occupant 520, thereby dazzling the occupant 520. In addition, the second part 2042 may seem brighter than the display 203 to the occupant 520, thereby reducing the visibility of the display 203. As a result, it may possibly be difficult for the occupant 520 to check the rear of the vehicle 1000. To address this, the present embodiment sets the reflectance of the second part 2042 to equal to or lower than the second reflectance when the vehicle 1000 is determined to be reversing. As a result, the amount of light reflected by the second part 2042 is reduced, and the occupant 520 is less likely to be dazzled. In addition, this mechanism can prevent the second part 2042 from seeming brighter than the display 203 to the occupant 520, thereby keeping the visibility of the display 203 high. Consequently, the occupant 520 can check the rear of the vehicle 1000 without any burden.

When the control circuit 202 determines that the vehicle 1000 is reversing based on the reverse information and determines that the illuminance of the rear of the vehicle 1000 is equal to or higher than a third illuminance threshold higher than the first illuminance threshold, the control circuit 202 may determine to set the reflectance of the second part 2042 to lower reflectance than in the case where it determines that the reflectance of the rear of the vehicle 1000 is equal to or higher than the first illuminance threshold and lower than the third illuminance threshold. When the control circuit 202 determines that the illuminance of the rear of the vehicle 1000 is equal to or higher than the first illuminance threshold and lower than the third illuminance threshold, for example, the control circuit 202 may determine to set the reflectance of the second part 2042 to a value within the first reflectance range. When the control circuit 202 determines that the illuminance of the rear of the vehicle 1000 is equal to or higher than the third illuminance threshold, the control circuit 202 may determine to set the reflectance of the second part 2042 to a value within the second reflectance range. The control circuit 202 may determine to set the reflectance of the second part 2042 based on the second illuminance information such that the reflectance of the second part 2042 decreases as the illuminance of the rear of the vehicle 1000 increases. With this mechanism, the occupant 520 is less likely to be dazzled, and the mirror image is less likely to be reflected in the second part 2042. Consequently, the occupant 520 can check the rear of the vehicle 1000 without any burden.

The control by the control circuit 202 described above is performed in common regardless of whether the display 203 is OFF or ON. The control circuit 202 may perform different controls depending on whether the display 203 is OFF or ON.

When the illuminance of the rear of the vehicle 1000 is determined to be equal to or higher than a second illuminance threshold based on the second illuminance information, and the vehicle 1000 is determined to be reversing based on the reverse information when the display 203 is OFF, the control circuit 202 may determine to set the reflectance of the first part 2041 to third reflectance lower than the first reflectance. The second illuminance threshold may be equal to the first illuminance threshold. The third reflectance is the intermediate reflectance, for example. The third reflectance may be equal to the second reflectance. With this mechanism, the occupant 520 is less likely to be dazzled. Consequently, the occupant 520 can check the rear of the vehicle 1000 without any burden.

When the vehicle 1000 is determined to be reversing, and the illuminance of the rear of the vehicle 1000 is determined to be equal to or higher than a predetermined value, for example, the control circuit 202 may determine to set the reflectance of the second part 2042 to the intermediate reflectance only when the display 203 is ON.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The advantageous effects according to the embodiments described in the present specification are given by way of example only and are not limited. The embodiments may have other advantageous effects.

What is claimed is:
1. A display device installed in a vehicle, the display device comprising:
 a display including a display surface on which video is displayed and being switched between ON and OFF;
 a reflectance control device positioned on a display surface side of the display and configured to change a reflectance for incident light; and
 a control circuit configured to control
  the reflectance of the reflectance control device,
  switching between ON and OFF of the display, and
  the video displayed on the display surface, wherein
 the reflectance control device includes a first part and a second part, the first part being positioned in a first region overlapping the display surface when viewed in a normal direction, the normal direction being normal to the display surface, the second part being positioned in a second region surrounding the first region when viewed in the normal direction of the display surface,
 the control circuit controls a reflectance of the second part based on at least one of speed information indicating a speed of the vehicle or reverse information indicating whether the vehicle is reversing, and
 when the display is OFF, the control circuit controls the reflectance control device such that the reflectance of the second part is lower than a reflectance of the first part.

2. The display device according to claim 1, wherein the control circuit independently controls the reflectance of the first part and the reflectance of the second part.

3. The display device according to claim 1, wherein
 the reflectance control device includes a polarization absorption element, a first electrode, a control substance, a second electrode and a third electrode, and a polarization reflection element, which are layered in this order toward the display surface side,
 the first electrode includes a part positioned in the first region and a part positioned in the second region,
 the second electrode is positioned in the first region, and the third electrode is positioned in the second region,
 the control substance is positioned between the first electrode and the second electrode and between the first electrode and the third electrode, and
 the reflectance of the reflectance control device changes by, a state of the control substance changing depending on potential difference at least one of between the first electrode and the second electrode or between the first electrode and the third electrode.

4. The display device according to claim 3, wherein
the reflectance control device includes a fourth electrode, a fifth electrode, and a sixth electrode, each facing the first electrode and being positioned in the second region,
when viewed in the normal direction of the display surface, the third electrode is positioned on an upper side of the second electrode, the fourth electrode is positioned on a right side of the second electrode, the fifth electrode is positioned on a lower side of the second electrode, and the sixth electrode is positioned on a left side of the second electrode,
the control substance is positioned between the first electrode and the fourth electrode, between the first electrode and the fifth electrode, and between the first electrode and the sixth electrode, and
the reflectance of the reflectance control device changes by, the state of the control substance changing depending on a potential difference at least one of between the first electrode and the fourth electrode, between the first electrode and the fifth electrode, or between the first electrode and the sixth electrode.

5. The display device according to claim 1, wherein, when the display is ON, the control circuit controls the reflectance control device such that the reflectance of the second part is higher than the reflectance of the first part.

6. The display device according to claim 1, wherein the control circuit controls the reflectance control device based on the speed information such that the reflectance of the second part decreases as the speed of the vehicle increases.

7. The display device according to claim 6, wherein, when the speed of the vehicle indicated by the speed information is equal to or higher than a first speed threshold, the control circuit displays, on the display, a dark image in which a peripheral part is darkly displayed.

8. The display device according to claim 6, wherein the control circuit switches the display from OFF to ON when the speed of the vehicle is determined to be equal to or higher than the second speed threshold based on the speed information.

9. A control circuit controlling a display device, the display device installed in a vehicle, wherein
the display device includes
a display including a first surface on which video is displayed and a second surface positioned opposite to the first surface, the display being switched between ON and OFF; and
a reflectance control device positioned on a first surface side of the display and configured to change a reflectance for incident light,
the reflectance control device includes a first part and a second part, the first part being positioned in a first region overlapping the display surface when viewed in a normal direction, the normal direction being normal to the first surface, the second part being positioned in a second region surrounding the first region when viewed in the normal direction of the display surface,
the control circuit is configured to
control the reflectance of the reflectance control device, the switching between ON and OFF of the display, and the video displayed on the first surface,
receive at least one of speed information indicating a speed of the vehicle or reverse information indicating whether the vehicle is reversing,
control a reflectance of the second part based on the at least one of the speed information or the reverse information, and
control the reflectance control device such that the reflectance of the second part is lower than a reflectance of the first part when the display is OFF.

10. A display device installed in a vehicle, the display device comprising:
a display including a display surface on which video is displayed and being switched between ON and OFF;
a reflectance control device positioned on a display surface side of the display and configured to change a reflectance for incident light; and
a control circuit configured to control
the reflectance of the reflectance control device,
switching between ON and OFF of the display, and
the video displayed on the display surface, wherein
the reflectance control device includes a first part and a second part, the first part being positioned in a first region overlapping the display surface when viewed in a normal direction, the normal direction being normal to the display surface, the second part being positioned in a second region surrounding the first region when viewed in the normal direction of the display surface, and
the control circuit controls a reflectance of the second part based on at least one of speed information indicating a speed of the vehicle or reverse information indicating whether the vehicle is reversing,
at least one of first illuminance information received from a first illuminance sensor detecting an illuminance of a front of the vehicle and second illuminance information received from a second illuminance sensor detecting an illuminance of a rear of the vehicle,
the control circuit controls the reflectance control device such that the reflectance of the second part is set to a first reflectance when the illuminance of the rear of the vehicle based on the second illuminance information is lower than a first illuminance threshold or when the reverse information does not indicate that the vehicle is reversing,
the control circuit controls the reflectance control device such that the reflectance of the second part is set to a second reflectance being lower than the first reflectance when the illuminance of the rear of the vehicle based on the second illuminance information is equal to or higher than the first illuminance threshold, and
the reverse information indicates that the vehicle is reversing.

11. The display device according to claim 10, wherein the control circuit controls the reflectance control device such that the reflectance of the first part is set to a third reflectance being lower than the first reflectance when
the display is OFF,
the illuminance of the rear of the vehicle based on the second illuminance information is equal to or higher than a second illuminance threshold, and
the reverse information indicates that the vehicle is reversing.

* * * * *